(12) United States Patent
Diaz-Botia et al.

(10) Patent No.: US 12,435,407 B2
(45) Date of Patent: Oct. 7, 2025

(54) METHODS FOR MAKING PROBE DEVICES AND RELATED DEVICES

(71) Applicant: NeuroOne Medical Technologies Corporation, Eden Prairie, MN (US)

(72) Inventors: Camilo Diaz-Botia, Monte Sereno, CA (US); Steve Mertens, Plymouth, MN (US); Derek Johnson, Chanhassen, MN (US); Vanessa Tolosa, Emeryville, CA (US)

(73) Assignee: NeuroOne Medical Technologies Corporation, Eden Prairie, MN (US)

( * ) Notice: Subject to any disclaimer, the term of this patent is extended or adjusted under 35 U.S.C. 154(b) by 0 days.

(21) Appl. No.: 17/392,773

(22) Filed: Aug. 3, 2021

(65) Prior Publication Data
US 2022/0033952 A1    Feb. 3, 2022

Related U.S. Application Data

(60) Provisional application No. 63/060,488, filed on Aug. 3, 2020.

(51) Int. Cl.
C23C 14/04 (2006.01)
A61N 1/05 (2006.01)

(52) U.S. Cl.
CPC .......... *C23C 14/042* (2013.01); *A61N 1/0551* (2013.01)

(58) Field of Classification Search
CPC .. C23C 14/042; A61N 1/0551; A61N 1/0531; A61N 1/05; A61N 1/526; A61N 1/529; A61N 1/531; A61N 1/534; A61N 1/536; A61N 1/539
See application file for complete search history.

(56) References Cited

U.S. PATENT DOCUMENTS

| | | | |
|---|---|---|---|
| 3,324,855 A | 6/1967 | Heimlich | |
| 4,158,916 A | 6/1979 | Adler | |
| 4,946,457 A | 8/1990 | Elliott | |
| 5,606,974 A | 3/1997 | Castellano et al. | |
| 5,904,711 A | 5/1999 | Flom et al. | |
| 5,916,213 A | 6/1999 | Haissaguerre et al. | |
| 5,991,650 A | 11/1999 | Swanson et al. | |
| 6,205,361 B1 | 3/2001 | Kuzma et al. | |
| 6,415,187 B1 | 7/2002 | Kuzma et al. | |
| 7,337,012 B2 | 2/2008 | Maghribi et al. | |

(Continued)

FOREIGN PATENT DOCUMENTS

| | | |
|---|---|---|
| EP | 1870127 A1 | 12/2007 |
| JP | 2003500099 A | 1/2003 |

(Continued)

OTHER PUBLICATIONS

European Patent Office "Extended European Search Report" From Application No. 21852651.5, Dated Jul. 1, 2024, pp. 1-11.

*Primary Examiner* — Dah-Wei D. Yuan
*Assistant Examiner* — Nga Leung V Law
(74) *Attorney, Agent, or Firm* — Fredrikson & Byron, P.A.

(57) ABSTRACT

Various methods for making probe devices that include the addition of electrode contact material using various different processes and/or techniques, along with the resulting devices. Some methods include adding electrode contact material such that the resulting electrode contacts are suitable for direct contact with patient tissue while encapsulating materials that are not.

19 Claims, 15 Drawing Sheets

(56) References Cited

U.S. PATENT DOCUMENTS

| | | |
|---|---|---|
| 7,387,626 B2 | 6/2008 | Edwards et al. |
| 7,611,455 B2 | 11/2009 | Borst et al. |
| 8,021,362 B2 | 9/2011 | Deem et al. |
| 8,229,539 B1 | 7/2012 | Motoyoshi et al. |
| 8,781,600 B2 * | 7/2014 | Janik .................. A61N 1/05 607/116 |
| 8,798,769 B1 | 8/2014 | Parker, Jr. |
| 9,006,014 B2 | 4/2015 | Mujeeb-U-Rahman et al. |
| 9,020,608 B2 | 4/2015 | Swanson |
| 9,314,618 B2 | 4/2016 | Imran et al. |
| 9,485,873 B2 * | 11/2016 | Shah .................. H05K 3/20 |
| 9,498,617 B2 | 11/2016 | Shah et al. |
| 9,788,432 B2 * | 10/2017 | Greenberg ........... A61N 1/0543 |
| 10,118,030 B2 | 11/2018 | Pellinen et al. |
| 10,245,178 B1 | 4/2019 | Heitzmann et al. |
| 2001/0011161 A1 | 8/2001 | Edwards et al. |
| 2003/0078633 A1 | 4/2003 | Firlik et al. |
| 2003/0124484 A1 | 7/2003 | Reiz |
| 2003/0190608 A1 | 10/2003 | Blackburn |
| 2004/0043479 A1 | 3/2004 | Tuggle et al. |
| 2004/0186543 A1 | 9/2004 | King et al. |
| 2005/0033286 A1 | 2/2005 | Eggers et al. |
| 2005/0261673 A1 | 11/2005 | Bonner et al. |
| 2006/0067649 A1 * | 3/2006 | Tung .................... G02B 26/001 385/147 |
| 2006/0129203 A1 | 6/2006 | Garabedian et al. |
| 2006/0252014 A1 | 11/2006 | Simon et al. |
| 2007/0073357 A1 | 3/2007 | Rooney et al. |
| 2007/0088417 A1 | 4/2007 | Schouenborg |
| 2007/0197892 A1 | 8/2007 | Shen et al. |
| 2007/0287991 A1 | 12/2007 | Mckay et al. |
| 2008/0039917 A1 | 2/2008 | Cross et al. |
| 2008/0312716 A1 | 12/2008 | Russell |
| 2009/0234426 A1 * | 9/2009 | Pellinen .................. A61B 5/24 607/116 |
| 2010/0114348 A1 | 5/2010 | Boyden et al. |
| 2010/0152880 A1 | 6/2010 | Boyden et al. |
| 2011/0034977 A1 | 2/2011 | Janik et al. |
| 2011/0077660 A1 | 3/2011 | Janik et al. |
| 2011/0130708 A1 | 6/2011 | Perry et al. |
| 2011/0130805 A1 | 6/2011 | Goel |
| 2011/0224682 A1 | 9/2011 | Westlund et al. |
| 2012/0143296 A1 | 6/2012 | Pianca et al. |
| 2013/0005169 A1 | 1/2013 | Soltis et al. |
| 2013/0011332 A1 | 1/2013 | Boyden et al. |
| 2013/0035574 A1 | 2/2013 | Anand |
| 2013/0035660 A1 | 2/2013 | Anand |
| 2013/0041445 A1 | 2/2013 | Erickson et al. |
| 2013/0110210 A1 | 5/2013 | North |
| 2013/0123775 A1 | 5/2013 | Grunewald et al. |
| 2013/0165990 A1 | 6/2013 | Mathur et al. |
| 2013/0238077 A1 | 9/2013 | Feler |
| 2013/0289684 A1 | 10/2013 | North et al. |
| 2013/0310823 A1 | 11/2013 | Gelfand et al. |
| 2013/0312258 A1 | 11/2013 | Swanson |
| 2014/0200511 A1 | 7/2014 | Boyden et al. |
| 2014/0277317 A1 | 9/2014 | Tooker et al. |
| 2014/0324117 A1 | 10/2014 | Bedenbaugh |
| 2015/0032194 A1 | 1/2015 | Mergen et al. |
| 2015/0045810 A1 | 2/2015 | Hoffer et al. |
| 2015/0066105 A1 | 3/2015 | Elborno |
| 2015/0066122 A1 | 3/2015 | Govea |
| 2015/0094734 A1 | 4/2015 | Staunton et al. |
| 2016/0000499 A1 | 1/2016 | Lennox et al. |
| 2016/0038940 A1 | 2/2016 | Babcock |
| 2016/0144189 A1 | 5/2016 | Bakker et al. |
| 2017/0007813 A1 | 1/2017 | Negi et al. |
| 2017/0173262 A1 | 6/2017 | Veltz |
| 2017/0245772 A1 | 8/2017 | Bierbrauer et al. |
| 2017/0246450 A1 | 8/2017 | Liu et al. |
| 2017/0340891 A1 | 11/2017 | Boggs et al. |
| 2018/0008821 A1 | 1/2018 | Gonzalez et al. |
| 2018/0117313 A1 | 5/2018 | Schmidt et al. |
| 2018/0126156 A1 | 5/2018 | Sparks et al. |
| 2018/0289949 A1 | 10/2018 | Bachinski et al. |
| 2018/0333571 A1 | 11/2018 | Pepin et al. |
| 2019/0336771 A1 | 11/2019 | Voit et al. |
| 2020/0008299 A1 | 1/2020 | Tran et al. |
| 2020/0030024 A1 | 1/2020 | Rao et al. |
| 2020/0091495 A1 | 3/2020 | Ghezzi et al. |
| 2020/0107743 A1 | 4/2020 | Bachinski et al. |
| 2020/0281489 A1 | 9/2020 | Rosa et al. |
| 2020/0391027 A1 | 12/2020 | Thakkar et al. |
| 2021/0008364 A1 | 1/2021 | Chen et al. |
| 2021/0046305 A1 | 2/2021 | Rosa et al. |
| 2021/0101010 A1 | 4/2021 | Howard et al. |

FOREIGN PATENT DOCUMENTS

| | | |
|---|---|---|
| WO | 2014113612 A1 | 7/2014 |
| WO | 2021021886 A1 | 2/2021 |

* cited by examiner

METHODS FOR MAKING PROBE DEVICES AND RELATED DEVICES

CROSS-REFERENCE TO RELATED APPLICATION(S)

This application claims the benefit under 35 U.S.C. § 119(e) to U.S. Provisional Application 63/060,488, filed Aug. 3, 2020 and entitled "Methods for Making Neural Probe Contacts and Related Devices," which is hereby incorporated herein by reference in its entirety.

FIELD

The various embodiments herein relate to probes for treatment of patients, including neural and spinal probes, and further including thin film probes. The neural probes can include electrode arrays, cortical and/or depth probes, and related systems and methods for detection, stimulation, and/or ablation. The spinal probes can include stimulation devices for stimulating the spinal cord and/or peripheral nerves and related systems and methods.

BACKGROUND

Utilizing a thin film, flexible printed circuit in a neural probe offers a thinner and more flexible product compared to current subdural and depth electrodes. The use of flexible printed circuits may also allow for increased product consistency and decreased production delays.

In a known neural probe, the electrode contacts (which are intended to make contact with some target tissue of the patient) at the distal end of the known probe typically consist of a contact (or "electrode," "surface," or "patient-contacting") metal disposed on and attached to the base conductive metal of the elongate conductive connector (which, in thin film probes is typically the flexible circuit). Further, each such contact can also have one or more different materials disposed between the base conductive material of the elongate connector and the surface metal to enhance to the attachment or joining of the connector and the contact metal.

It is understood that the metals typically used in thin film flex circuit manufacturing (metals such as copper and/or nickel) corrode, and thus cannot be used as electrode contacts in a neural probe incorporating flexible circuit components. However, the non-corrosive metals and their compounds such as iridium, platinum, platinum/iridium, iridium oxide, ruthenium, and/or ruthenium oxide cannot be easily incorporated into flex circuit neural probes, because the known methods of making such probes with such metals are inefficient and costly. This inefficiency related to adding non-corrosive metals to electrode contacts of flex circuit neural probes is one disadvantage of known manufacturing processes.

Certain known neural probes have electrode contacts that are solid metal disks welded to elongate connectors that are wires. One disadvantage of such probes is that the known manufacturing processes do not lend themselves to the manufacturing of probes incorporating flex circuit components.

There is a need in the art for improved processes for making flex circuit neural probes with electrode contacts and the resulting devices.

BRIEF SUMMARY

Discussed herein are various methods of making a probe device that includes application or attachment of electrode contact material to the device, and the resulting systems and devices.

In Example 1, a method of making a probe comprises positioning a thin film elongate connector on a first insulation layer, depositing an electrode contact material in contact with a distal end of the elongate connector via physical vapor deposition, and positioning a first side of a second insulation layer in contact with a first side of the first insulation layer, wherein the second insulation layer comprises an opening defined in fluidic communication with the electrode contact material.

Example 2 relates to the method according to Example 1, further comprising positioning a third insulation layer in contact with a second side of the first insulation layer.

Example 3 relates to the method according to Example 1, further comprising positioning an adhesive layer in contact with a second side of the first insulation layer.

Example 4 relates to the method according to Example 1, further comprising positioning a third insulation layer in contact with a second side of the second insulation layer.

Example 5 relates to the method according to Example 1, further comprising treating the first side of the first insulation layer and the elongate connector before depositing the electrode contact material.

Example 6 relates to the method according to Example 1, further comprising disposing a mask over the elongate connector and the first insulation layer before positioning the electrode contact material in contact with the distal end of the elongate connector, wherein the mask comprises a mask opening defined within the mask, wherein the mask opening is in fluidic communication with the distal end of the elongate connector.

Example 7 relates to the method according to Example 1, wherein the opening in the second insulation layer and the electrode contact material disposed therein form an electrode contact.

Example 8 relates to the method according to Example 1, wherein the positioning the thin film elongate connector on the first insulation layer comprises positioning the thin film elongate connector on the first side of the first insulation layer.

Example 9 relates to the method according to Example 1, wherein the positioning the thin film elongate connector on the first insulation layer comprises positioning an elongate portion of the elongate connector on the second side of the first insulation layer and a contact portion of the elongate connector on the first side of the first insulation layer, wherein the contact portion is electrically coupled to the elongate portion via a transverse portion.

In Example 10, a method of making a probe comprises positioning a thin film elongate connector along a length of a first side of a base insulation layer, depositing an electrode contact material in contact with a distal end of the elongate connector via physical vapor deposition, and positioning a first side of a top insulation layer in contact with the first side of the base insulation layer, wherein the top insulation layer comprises a contact opening defined in the top insulation layer, wherein the contact opening is in fluidic communication with the electrode contact material.

Example 11 relates to the method according to Example 10, further comprising positioning the base insulation layer on a support plate and positioning the base insulation layer and the support plate in a deposition chamber before depositing the electrode contact material.

Example 12 relates to the method according to Example 11, further comprising, before positioning the support plate in the chamber, attaching a mask to the support plate such that the first insulation layer and the elongate connector are disposed between the support plate and the mask, wherein the mask comprises a mask opening defined within the mask, wherein the mask opening is in fluidic communication with the contact opening.

Example 13 relates to the method according to Example 10, further comprising, before depositing the electrode contact material, treating the first side of the base insulation layer and the elongate connector.

Example 14 relates to the method according to Example 13, wherein the treating the first side of the base insulation layer and the elongate connector comprises etching the first side of the base insulation layer and the elongate connector with an etching plasma gas.

In Example 15, a method of making a probe comprises positioning a thin film elongate connector on a middle insulation layer, wherein a contact portion of the elongate connector is disposed on a first side of the middle insulation layer and an elongate portion of the elongate connector is disposed on a second side of the middle insulation layer, wherein the contact portion is electrically coupled to the elongate portion via a transverse portion, depositing an electrode contact material in contact with the contact portion of the elongate connector via physical vapor deposition, positioning a first side of a top insulation layer in contact with the first side of the middle insulation layer, wherein the top insulation layer comprises a contact opening defined in the top insulation layer, wherein the contact opening is in fluidic communication with the electrode contact material, and positioning a first side of a bottom insulation layer in contact with a second side of the middle insulation layer.

Example 16 relates to the method according to Example 15, further comprising, before depositing the electrode contact material, positioning the middle insulation layer and elongate connector on a support plate, attaching a mask to the support plate such that the middle insulation layer and elongate connector is disposed between the support plate and the mask, wherein the mask comprises a mask opening defined within the mask, wherein the mask opening is in fluidic communication with the contact portion of the elongate connector, and positioning the support plate in a deposition chamber.

In Example 17, a method of making a probe comprises positioning a thin film elongate connector on a first insulation layer, positioning the first insulation layer and the elongate connector on a support plate, positioning a mask over the first insulation layer and the elongate connector, positioning the support plate in a deposition chamber, depositing an electrode contact material in contact with a distal end of the elongate connector via physical vapor deposition within the deposition chamber, and positioning a first side of a second insulation layer in contact with a first side of the first insulation layer, wherein the second insulation layer comprises an opening defined in fluidic communication with the electrode contact material.

Example 18 relates to the method according to Example 17, further comprising, before depositing the electrode contact material, attaching the mask to the support plate such that the first insulation layer and the elongate connector is disposed between the support plate and the mask, wherein the mask comprises a mask opening defined within the mask, wherein the mask opening is in fluidic communication with the distal end of the elongate connector.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

The various embodiments herein relate to methods for making contacts for a probe device and the resulting devices, including incorporation of non-corrosive metals via a manufacturing process that is easier and more efficient than known processes. While most devices herein will be described as neural probes, the various method and device embodiments herein can be neural or spinal probes. In certain implementations, the contacts are created by attaching a specific contact metal (for contacting the patient tissue), including, for example, platinum (or combination of metals), to the elongate connector. Further, various methods are set forth herein for attaching or joining the contact metal of each contact to the connector metal, thereby resulting in contacts that match known contacts in contact surface resistance while also having reduced thickness and increased flexibility and deliverability. According to certain embodiments, the various processes disclosed or contemplated herein can be used to create contacts on various types of neural or spinal probes, including thin film probes. Further, the various processes herein are deposition processes that result in deposition of electrode contact material onto the target device layers such that the resulting device has electrode contacts suitable for direct contact with patient tissue while encapsulating materials that are not suitable for contact with patient tissue. In certain implementations, the deposition process used in any of the exemplary embodiments herein can be a physical vapor deposition process.

Various embodiments of the probes resulting from the various methods herein are thin film devices. For purposes of this application, the term "thin film" can mean a microscopically thin layer of material that is deposited onto a metal, ceramic, semiconductor or plastic base, or any device having such a component. Alternatively, for purposes of this application, it can also mean a component that is less than about 0.005 inches thick and contains a combination of conductive and dialectric layers or a device that has one or more such components, wherein the components can be combined in a stacked or layered configuration in the device. Finally, it is also understood, for purposes of this application, to have the definition that is understood by one of ordinary skill in the art.

One method for joining the contact metal to the base metal of the connector is welding. More specifically, the two components can be joined via either ultrasonic welding or resistance welding.

Figure 1A:
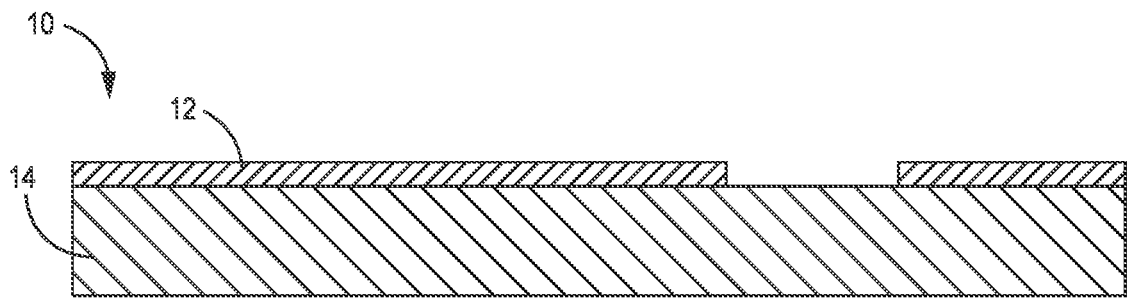
FIG. 1A is a cross-sectional side view of an insulation layer and trace of a probe device, according to one embodiment.
Figure 1B:
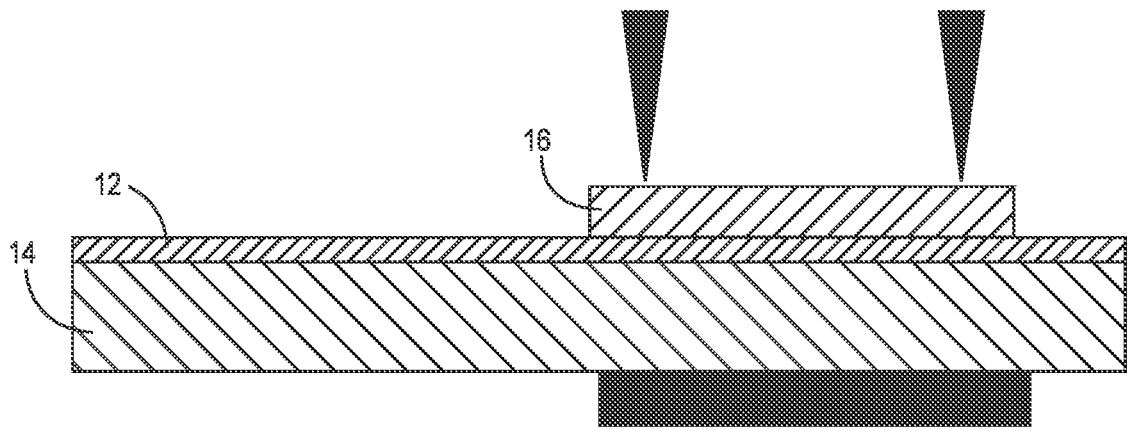
FIG. 1B is a cross-sectional side view of the insulation layer and trace of FIG. 1A, with an electrode material applied thereto, according to one embodiment.
Figure 1C:
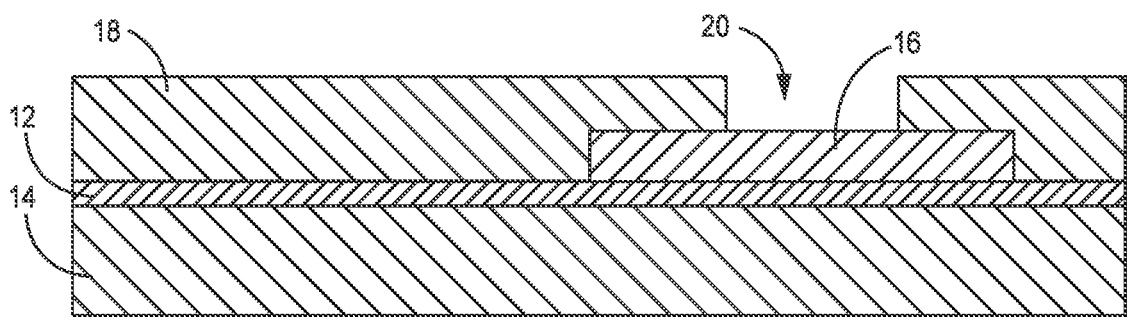
FIG. 1C is a cross-sectional side view of the insulation layer and trace of FIG. 1B, with another insulation layer applied thereto, according to one embodiment.

For example, FIGS. 1A-1C depict the steps for making probe devices with electrode contacts using ultrasonic welding, according to one embodiment. In FIG. 1A, the neural probe 10 has an elongate connector (also referred to herein as "interconnector," "interconnect trace," or "trace") 12 that serves as the elongate conductor in the probe 10 that connects the electrode contacts with the proximal connector (not shown) at the proximal end of the probe 10. In one embodiment, the elongate connector 12 is a flexible circuit 12. The flexible circuit 12 is disposed on the base material 14.

In the first step of the welding process as best shown in FIG. 1B, the contact surface material 16 is welded to the flexible circuit 12 via ultrasonic welding. Once the contact material 16 is joined to the flexible circuit 12, the second step involves the top material 18 being added to the probe 10 as shown in FIG. 10, thereby resulting in a final product of the probe 10 with the electrode contact 20 having the contact material 16. Once the top material 18 is added, the bottom 14 and top material 18 or layers 14, 18 form the body 14, 18 of the device 10. In certain alternative embodiments, an additional step can be a plating step in which the connector 12 is first plated with a plating material (not shown) and then the contact material 16 is ultrasonically welded to the plated material.

Figure 2A:
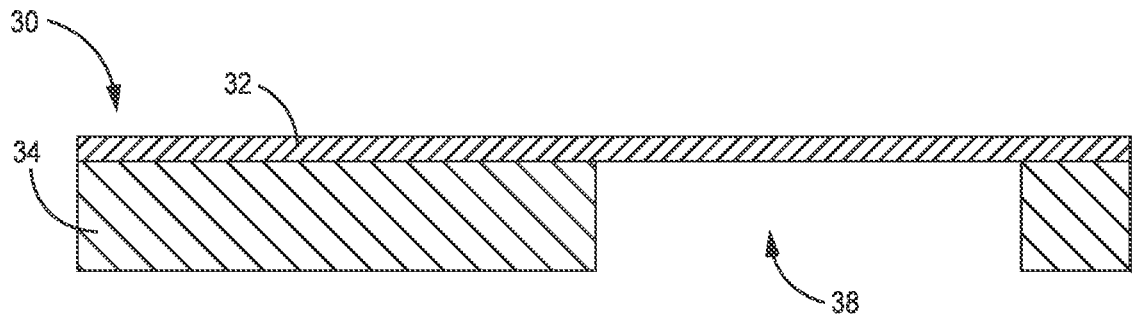
FIG. 2A is a cross-sectional side view of an insulation layer and trace of a probe device, according to one embodiment.
Figure 2B:
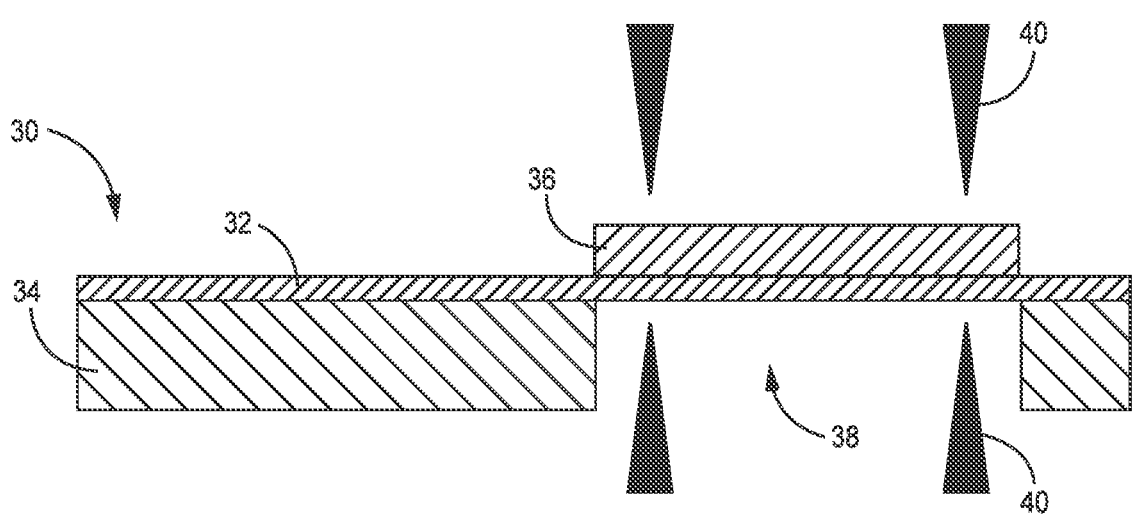
FIG. 2B is a cross-sectional side view of the insulation layer and trace of FIG. 2A, with an electrode material applied thereto, according to one embodiment.
Figure 2C:
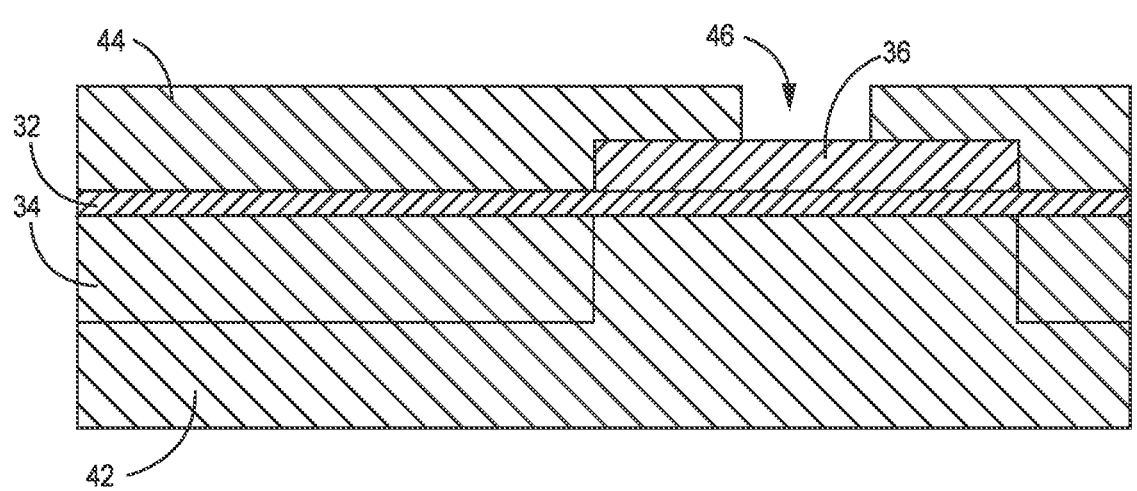
FIG. 2C is a cross-sectional side view of the insulation layer and trace of FIG. 2B, with two additional insulation layers applied thereto, according to one embodiment.

FIGS. 2A-2C depict another embodiment, in which the welding process is a specific type of welding process: a first resistance welding process. In FIG. 2A, the neural probe 30 has a elongate connector 32 that serves as the elongate conductor in the probe 30. In one embodiment, the elongate connector 32 is a flexible circuit 32. The flexible circuit 32 is disposed on the base material 34. In this specific implementation, the base material 34 has a gap or opening 38 defined therein such that the welding apparatus can be disposed in that gap 38 to access the connector 32 as will be discussed below.

In the first step of the welding process as best shown in FIG. 2B, the contact surface material 36 is welded to the flexible circuit 32 via resistance welding. More specifically, the welding apparatus 40 (schematically represented by the two welding tipsas shown) is positioned such that it can contact both the contact surface material 36 and the flexible circuit 32 as shown, with the lower portion of the apparatus 40 being disposed within the gap 38 discussed above. Once the contact material 36 is joined to the flexible circuit 32, the next step involves the addition of further (or additional) bottom material 42 and the top material 44 to the probe 30, thereby resulting in a final product of the probe 30 with the electrode contact 46 having the contact material 36. The second bottom layer 42 fills in the gap 38 discussed above. Once the additional bottom material 42 and the top material 44 are added, the first and second bottom layers 34, 42 and top layer 44 form the body 34, 42, 44 of the device 30. In certain alternative embodiments, an additional step can be a plating step in which the connector 32 is first plated with a plating material (not shown) and then the contact material 36 is resistance welded to the plated material.

Figure 3A:
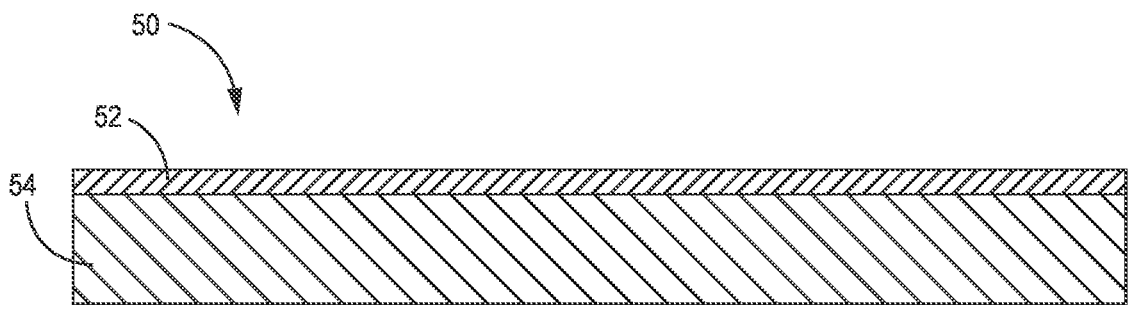
FIG. 3A is a cross-sectional side view of an insulation layer and trace of a probe device, according to one embodiment.

A second resistance welding process using "parallel gap" resistance welding is depicted in FIGS. 3A-3D, according to another embodiment. In FIG. 3A, the neural probe 50 has an elongate connector 52 that serves as the elongate conductor in the probe 50. In one embodiment, the elongate connector 52 is a flexible circuit 52. The trace 52 is disposed on the base layer 54.

Figure 3B:
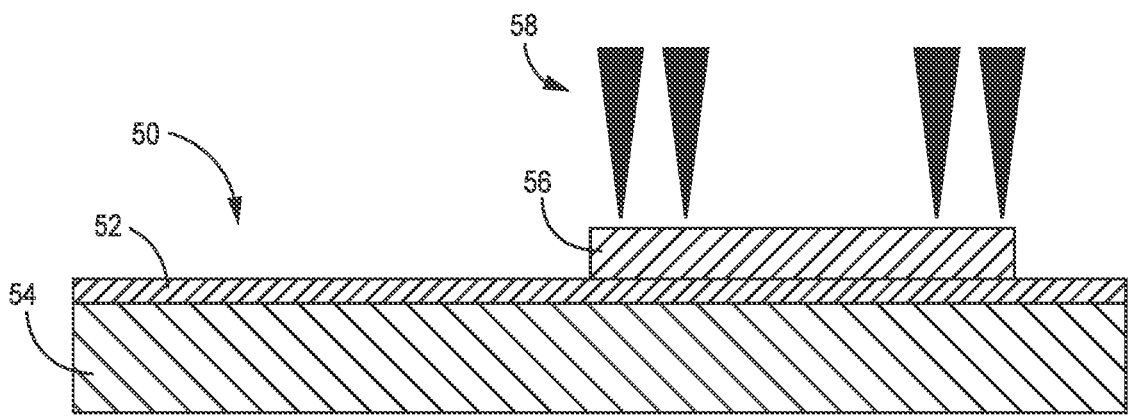
FIG. 3B is a cross-sectional side view of the insulation layer and trace of FIG. 3A, with an electrode material applied thereto, according to one embodiment.
Figure 3C:
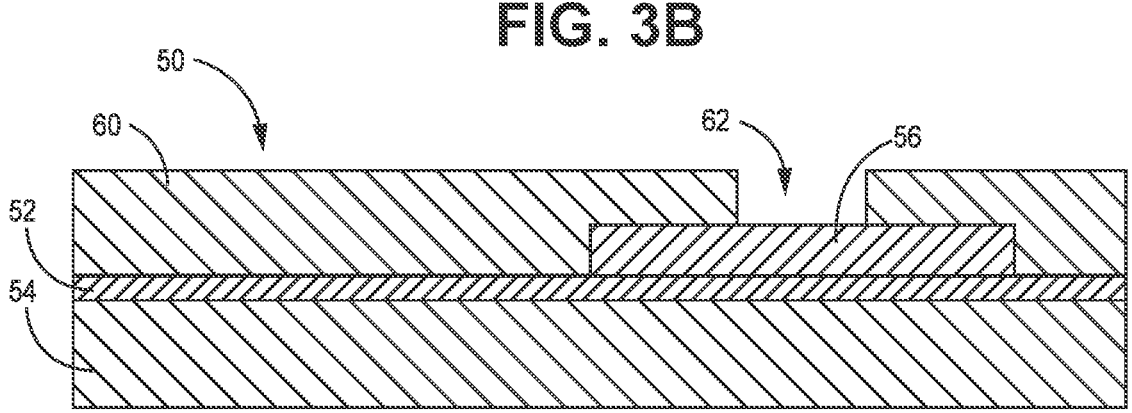
FIG. 3C is a cross-sectional side view of the insulation layer and trace of FIG. 3B, with another insulation layer applied thereto, according to one embodiment.

In the first step of the welding process as best shown in FIG. 3B, the contact surface material 56 is disposed on and welded to the trace 52 via "parallel gap" resistance welding using a resistance welding apparatus 58 (schematically represented by the four welding tips, as shown). More specifically, the welding apparatus 58 is positioned such that the two contacts of the apparatus 58 are placed on the contact surface material 56 near each other as shown. Once the contact material 56 is joined to the flexible circuit 52, the next step involves the addition of the top material 60 to the probe 50, thereby resulting in a final product of the probe 50 with the electrode contact 62 having the contact material 56. Once the top material 60 is added, the base layer 54 and top layer 60 form the body 54, 60 of the device 50. In certain alternative embodiments, an additional step can be a plating step in which the connector 52 is first plated with a plating material (not shown) and then the contact material 56 is resistance welded to the plated material.

Figure 3D:
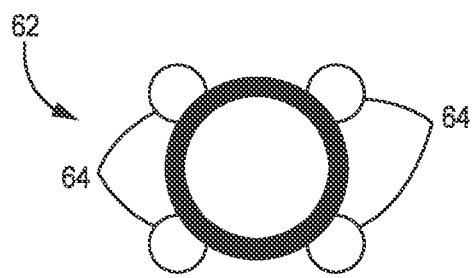
FIG. 3D is a top view of an electrode contact of the device of FIG. 3C, according to one embodiment.

A top view of the contact 62 is depicted in FIG. 3D, according to one embodiment. In various implementations, multiple weld locations 64 can be provided in different locations on the contact 62, including, for example, the configuration of four weld locations 64 as shown. Once the welding is completed, the top layer 60 can be placed over a portion of the contact 62 to cover any surface anomalies caused by the welding process at the weld locations 64 such that the weld locations are covered by the top layer 60.

Figure 4A:
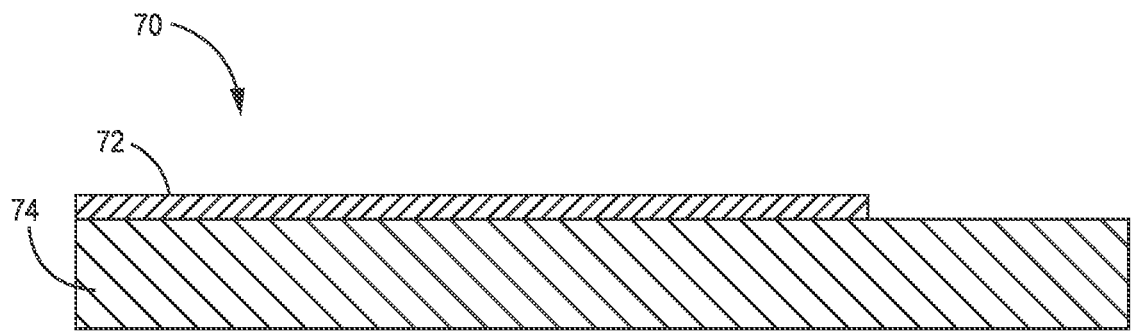
FIG. 4A is a cross-sectional side view of an insulation layer and trace of a probe device, according to one embodiment.
Figure 4B:
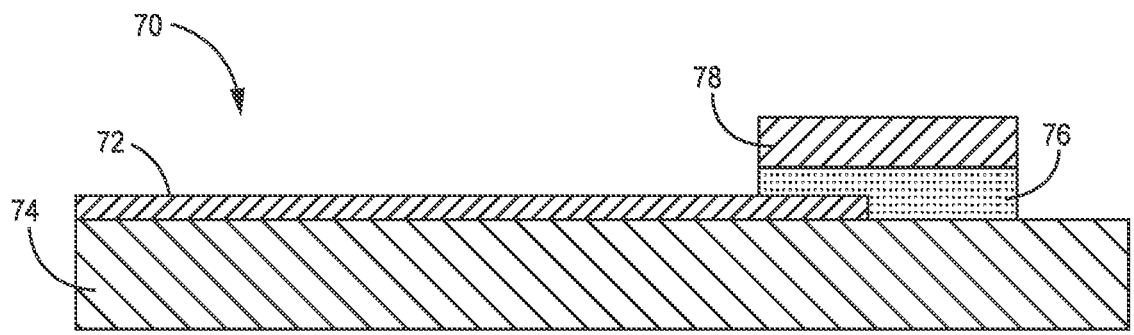
FIG. 4B is a cross-sectional side view of the insulation layer and trace of FIG. 4A, with a conductive adhesive material and an electrode material applied thereto, according to one embodiment.
Figure 4C:
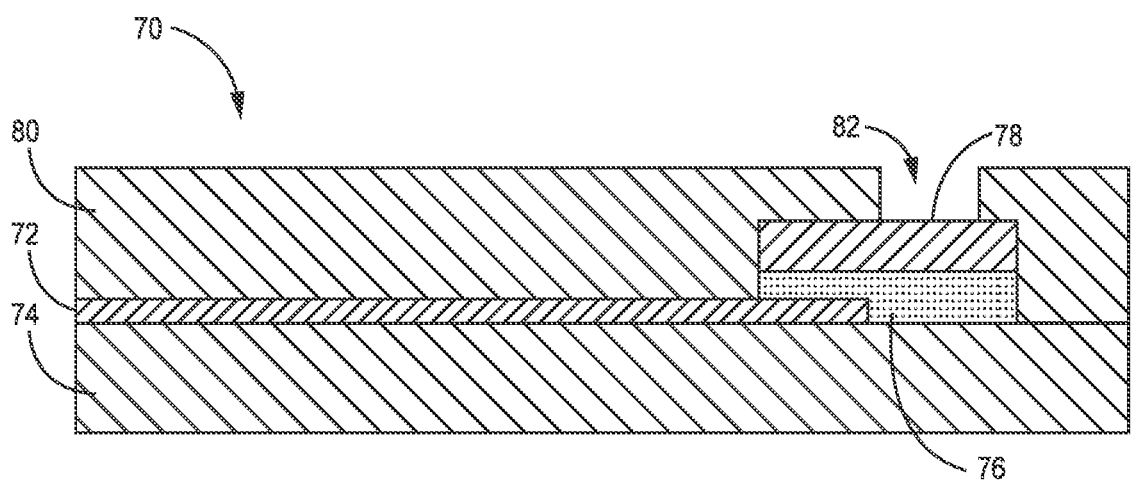
FIG. 4C is a cross-sectional side view of the insulation layer and trace of FIG. 4B, with another insulation layer applied thereto, according to one embodiment.

In addition to the specific welding process embodiments described above, another joining process making probe devices with electrode contacts is shown in FIGS. 4A-4C, according to another embodiment, in which the process utilizes conductive adhesive bonding. In FIG. 4A, the neural probe 70 has an elongate connector 72 that serves as the elongate conductor in the probe 70. In one embodiment, the elongate connector 72 is a flexible circuit 72. The trace 72 is disposed on the base layer 74.

In the first step of the attachment process as best shown in FIG. 4B, a conductive adhesive material 76 is disposed on the trace 72 and the base layer 74 as shown. Once the adhesive material 76 is disposed as desired, the contact material 78 is disposed on the adhesive material 76 such that the contact material 78 is conductively coupled to the trace 72. Once the contact material 78 is joined to the connector 72, the next step, as best shown in FIG. 4C, involves the addition of the top material 80 to the probe 70, thereby resulting in a final product of the probe 70 with the electrode contact 82 having the contact material 78. Once the top material 80 is added, the base layer 74 and top layer 80 form the body 74, 80 of the device 70. In certain alternative embodiments, an additional step can be a plating step in which the connector 72 is first plated with a plating material (not shown) and then the adhesive material 76 is disposed on the plated material.

Figure 5A:
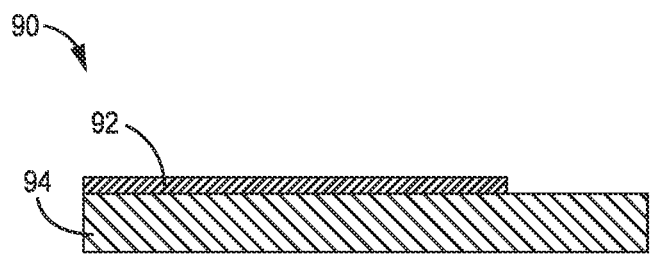
FIG. 5A is a cross-sectional side view of an insulation layer and trace of a probe device, according to one embodiment.
Figure 5B:
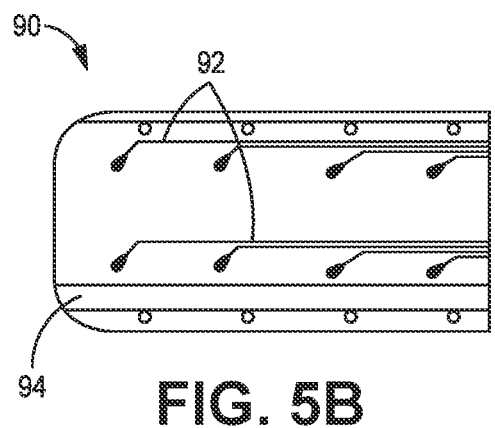
FIG. 5B is a top view of the insulation layer and trace of the probe device of FIG. 5A, according to one embodiment.

In yet another implementation, the electrode contact can be joined to the elongate connector via a deposition process, as shown in FIGS. 5A-5I. The deposition process can be any known process, including, for example, sputtering, electron beam deposition, thermal deposition, etc. In FIG. 5A, the neural probe 90 has an elongate connector 92 that serves as the elongate conductor in the probe 90. In one embodiment, the elongate connector 92 is a flexible circuit 92. The trace 92 is disposed on the base layer 94. A top view of the probe 90 is shown in FIG. 5B, in which eight elongate connectors 92 are shown.

Figure 5C:
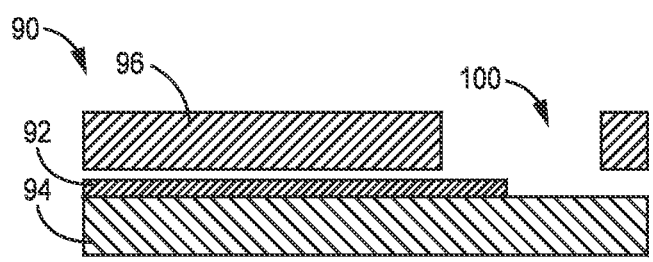
FIG. 5C is a cross-sectional side view of the insulation layer and trace of FIG. 5A, with a temporary mask positioned thereon, according to one embodiment.
Figure 5D:
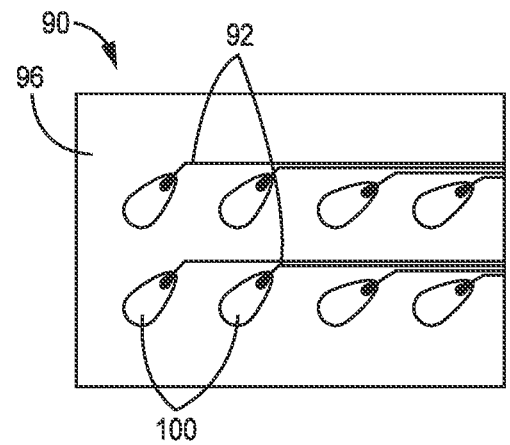
FIG. 5D is a top view of the insulation layer and trace of the probe device and temporary mask disposed thereon of FIG. 5C, according to one embodiment.
Figure 5E:
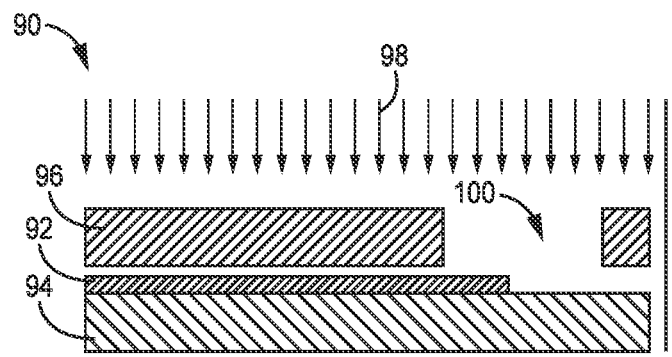
FIG. 5E is a cross-sectional side view of the insulation layer, trace, and mask of FIG. 5C, with electrode contact material being applied thereto, according to one embodiment.

In the first step of the deposition process as best shown in FIGS. 5C and 5D, a temporary mask 96 is disposed over the connectors 92. The mask 96 has openings 100 defined within the mask 96 that are shaped in the target shape of the contacts to be formed. Each opening 100 is in fluidic communication with an end of an elongate connector 92. Once the mask 96 is disposed as desired, the contact material 98 is deposited onto the probe 90 and mask 96 such that the material 98 is positioned within the openings 100, thereby putting the material 98 in each such opening 100 in contact with the connector 92 end disposed within that opening 100. Other known approaches may be used to pattern the material to be deposited such as, for example, photoresist masking, dry film masking, lift off, wet etch, dry etch, and other such known approaches.

Figure 5F:
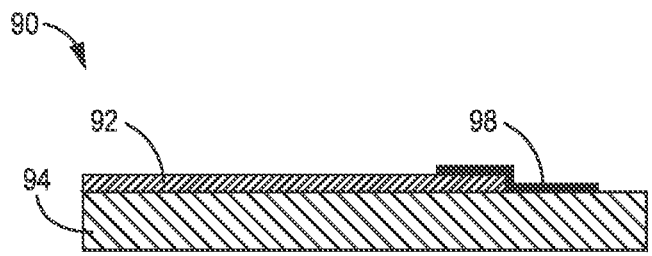
FIG. 5F is a cross-sectional side view of the insulation layer and trace of FIG. 5E, with the electrode contact material applied thereto, according to one embodiment.
Figure 5G:
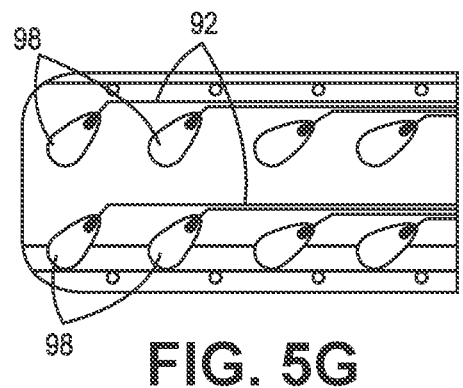
FIG. 5G is a top view of the insulation layer, trace, and electrode contact material of the probe device of FIG. 5F, according to one embodiment.
Figure 5H:
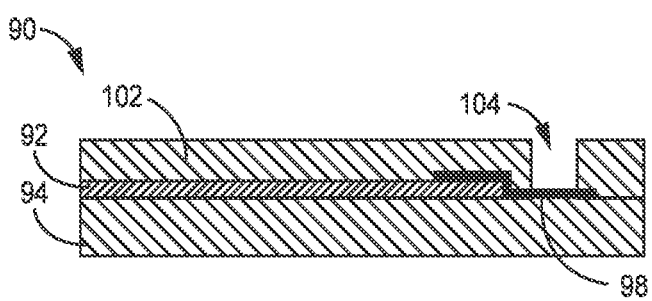
FIG. 5H is a cross-sectional side view of the insulation layer, trace, and electrode material of FIG. 5F, with another insulation layer applied thereto, according to one embodiment.
Figure 5I:
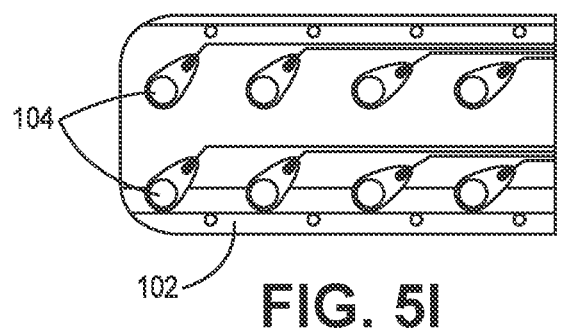
FIG. 5I is a top view of the insulation layer, trace, electrode contact material, and additional insulation layer of the probe device of FIG. 5H, according to one embodiment.

Once the material 98 is deposited within the openings 100 as desired, the mask 96 can be removed, as best shown in FIG. 5F and 5G, leaving only the contact material 98 disposed where the openings 100 were defined. Once the mask 96 is removed, the next step, as best shown in FIGS. 5H and 5I, involves the addition of the top material 102 to the probe 90, thereby resulting in a final product of the probe 90 with the electrode contacts 104 having the contact material 98. Once the top material 102 is added, the base layer 94 and top layer 102 form the body 94, 102 of the device 90. In certain alternative embodiments, an additional step can be a plating step in which the connectors 92 are plated with a plating material (not shown) either before or after the contact material 98 is deposited. That is, in one optional implementation, the connectors 92 are first plated with a plating material (not shown) and then the contact material 98 is deposited, or, alternatively, in the second optional implementation, the contact material 98 is first deposited and then the contact layer 98 is plated with the plating material (not shown).

In the above embodiment and any of the various embodiments disclosed or contemplated herein, the contact material (including contact material 98) that is deposited (such as via physical vapor deposition) or otherwise attached to the device can include, but is not limited to, any one or more of platinum, titanium, gold, iridium, platinum/iridium, iridium oxide, ruthenium, and ruthenium oxide. Further, the traces in the various implementations herein (including traces 92) can be made of, but are not limited to, any one or more of copper, titanium, gold, platinum, palladium, and aluminum. Alternatively, the traces can be made of any known material having the same or similar characteristics. In addition, the insulation layers in the various embodiments herein (including insulation layers 94, 102) can be made of, but are not limited to, any one or more of polyimide, polyamide, parylene, epoxy, liquid crystal polymer, silicone, and mylar. Alternatively, the insulation layers can be made of any known material—including other polymeric materials, having the same or similar characteristics.

Figure 6A:
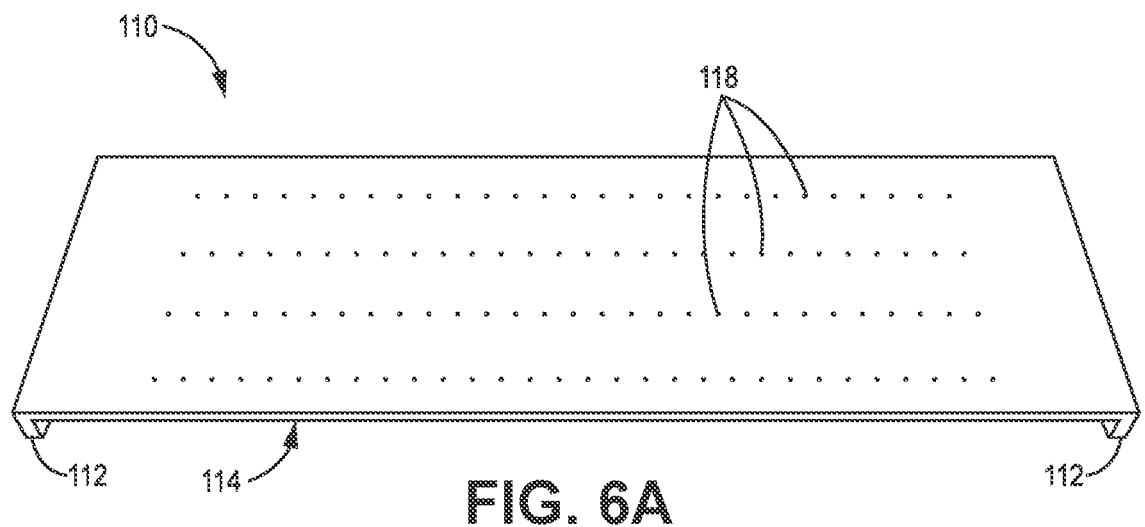
FIG. 6A is a perspective view of a support plate, according to one embodiment.
Figure 6B:
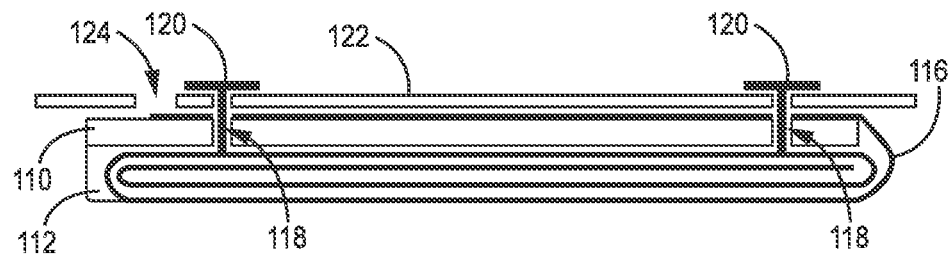
FIG. 6B is a cross-sectional side view of the support plate of FIG. 6A with a device panel and a temporary mask disposed therein, according to one embodiment.
Figure 6C:
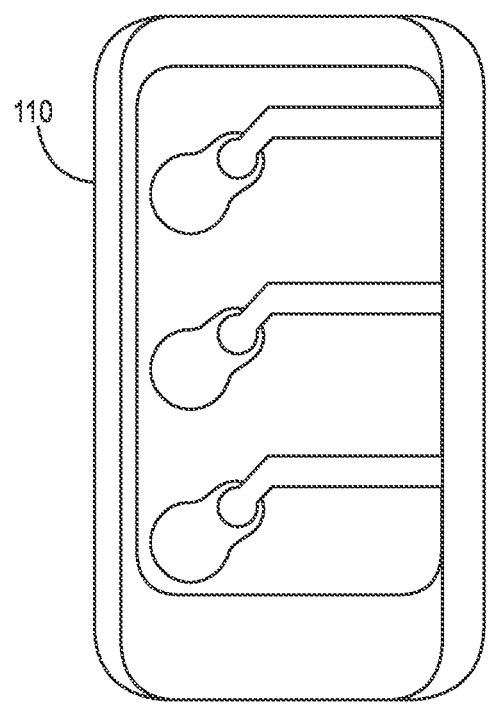
FIG. 6C is a top view of the support plate with the device panel and temporary mask disposed therein of FIG. 6B, according to one embodiment.

In the various deposition process embodiments as disclosed or contemplated herein, it is understood that the deposition step typically takes place in a known deposition chamber (not shown). However, certain of the various implementations herein include contact arrays that are relatively large in relation to such a chamber. Thus, in accordance with some implementations, as best shown in FIGS. 6A-6C, a method is provided for using a support plate 110 on which the panel (which includes the bottom layer as described above) is disposed for purposes of placement in the chamber. That is, any of the various deposition processes described herein can be performed using the support plate 110.

As best shown in FIG. 6A, the support plate 110 is a rectangular structure that is sized to fit within a deposition chamber or to fit more panels within the chamber. In one embodiment, the plate 110 has protrusions 112 extending from one side of the plate 110 at each end of the plate 110 such that the protrusions 112 define a cavity 114 therebetween. In addition, the plate 110 in certain embodiments has securement mechanisms to allow for attachment of the panel 116 and associated mask 122 to the plate 110. According to one exemplary implementation, the plate 110 has openings 118 defined within the plate 110 that can be used to removably attach the panel 116 on which the deposition process is being performed and the mask 122 used for that process. In accordance with some implementations, the openings 118 are threaded holes 118 that can receive threaded screws 120 or other threaded attachment devices that can be used to removably attach the mask 122 and panel 116 to the support plate 110 prior to deposition. The openings 118 and threaded screws 120 allow for the mask 122 to be sufficiently secured to the target panel 116 on the plate 110 such that the deposited material does not seep, leak, or otherwise extend beyond the desired deposition area. That is, the mask 122 is urged into contact with the panel 116 via the force of the threaded screws 120 such that any gaps between the mask 122 and the panel 116 are eliminated, thereby causing the deposition material to remain solely in the exposed areas of the panel 116 created by the appropriate opening in the mask 122. As such, the use of securement mechanisms (such as threaded screws and openings) creates an appropriate seal between the mask 122 and panel 116 that prevents electrical shorts in the resulting device that would otherwise be caused by the deposited electrode contact material extending into any gaps between the mask 122 and the panel 116 and electrically coupling to adjacent features.

In use, as best shown in FIGS. 6B (side view) and 6C (top view), the panel 116 is positioned on the support plate 110 such that the portion of the panel 116 on which the deposition is going to occur is disposed on the top of the plate 110 as shown. Further, the mask 122 is then positioned on the panel 116 as desired such that the deposition area (defined by the opening 124 in the mask 122) is positioned as desired. The remainder of the panel 114 is folded such that the remainder is disposed within the cavity 114 of the support plate 110. At this point, the screws 120 are positioned through the openings in the mask 122 and the panel 116 and into the openings 118 in the plate 110, thereby urging the mask 122 into contact with the panel 116 and securing both the mask 122 and panel 116 against the plate 110. The resulting "stacked" plate 110 with the mask 122 and panel 116 attached is positioned in the deposition chamber and the deposition process is performed.

In certain embodiments, one additional step is performed within the chamber prior to deposition to enhance the adhesion of the deposition material to the target layer(s) of the panel 116. That is, once the stacked plate 110 is positioned in the chamber, a layer treatment step is performed to prepare the target layers (either the trace layer, the insulation layer, or both) for contact with and adherence to the deposited contact material. One such treatment step is an etching step that removes contaminants, impurities, and/or surface oxidation from the exposed metal and/or polymeric layers on the panel 116 and can create a "rougher" or more textured surface. For example, in certain implementations, the exposed metal layer (typically the trace as described in the various embodiments herein) can be copper and the exposed insulation layer can be a polyimide. The etching step proceeds with the chamber being filled with an appropriate etching gas such as, for example, argon. Specific etching processes involving argon gas that can be used for this step including the known argon sputter etch or the argon ion mill etch. Alternatively, any appropriate known etching process or other physical treatment process can be used. According to certain embodiments, the treatment step enhances or promotes the adhesion of the deposition material to the target layers. That is, the deposited electrode contact material can adhere better to the target layers—both the trace layer and/or the insulation layer—after they have been treated to change the physical characteristics of those layers.

After the treatment step, the electrode contact material is then deposited as described in the various embodiments herein. Alternatively, the treatment step can be performed prior to positioning the panel 116 in the chamber (not shown). For example, the pre-chamber treatment step can be a chemical treatment in which a chemical is applied to the panel 116 that changes the characteristics of the target layers. For example, the chemical treatment can be silane functionalization or the like. In a further exemplary embodiment, the pre-chamber treatment step can be any of a variety of different cleaning treatments. For example, the cleaning treatment can be a plasma cleaning with gases such as oxygen, argon, fluorinated carbon compounds, or the like. Alternatively, the cleaning treatment can be the application (via wiping or soaking, for example) of cleaning solutions such as organic solutions using acetone, or isopropyl alcohol or other alcohols, or mildly acidic solutions such as sulfuric acid, citric acid, nitride acid, hydrochloric acid, or other commonly known cleaning solutions such as piranha (which is a mix of sulfuric acid and hydrogen peroxide). In another specific exemplary implementation, the cleaning treatment can be a caustic etch. In a further alternative, the cleaning treatment can be a rinsing of the device or target layer(s) with water. According to yet another alternative, the cleaning treatment can be any known cleaning process that can be used to enhance or promote the adhesion of the deposition material to the target layer(s).

It is understood that similar attachment methods as those described above can also be used for electrode contacts on depth electrodes.

Figure 7:
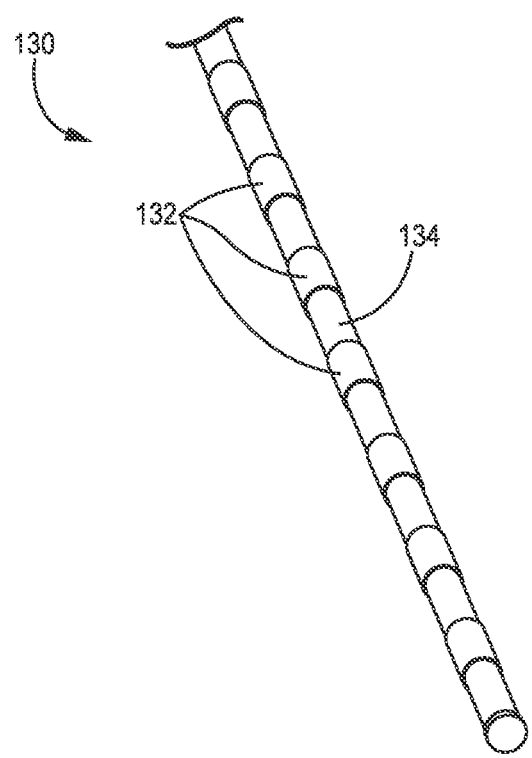
FIG. 7 is a perspective view of a depth electrode, according to one embodiment.

In one embodiment, as shown in FIG. 7, a depth electrode 130 can have the contact bands 132 attached to the elongate connector 134 via physical attachment of the bands 132 thereto. That is, each band 132 is made up of the appropriate metal, which can be any metal of the contact material discussed above. And each band 132 is swaged over or otherwise positioned over and attached to the elongate connector 134. In certain implementations, the elongate connector 134 is a flex circuit 134 that is disposed around an inner rod or tube (not shown). It is understood that any other known method for further adhering the contact bands 132 to the connector 134 can also be used. For example, each band 132 can be attached via any combination of swaging, bonding, welding, or soldering.

Figure 8A:
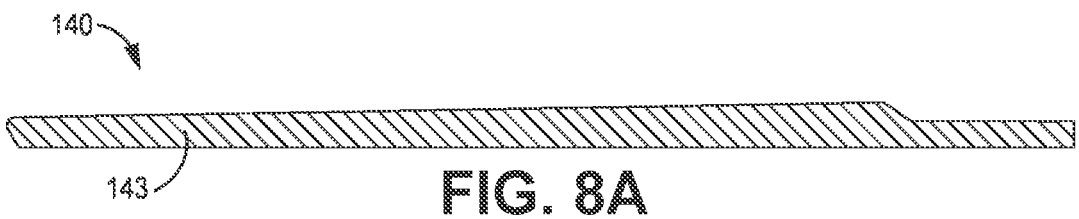
FIG. 8A is a top view of a base layer of a probe device, according to one embodiment.
Figure 8B:
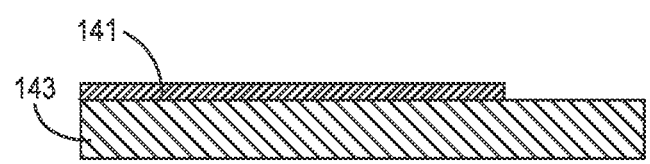
FIG. 8B is a cross-sectional side view of the base layer of FIG. 8A with a trace disposed thereon, according to one embodiment.
Figure 8C:
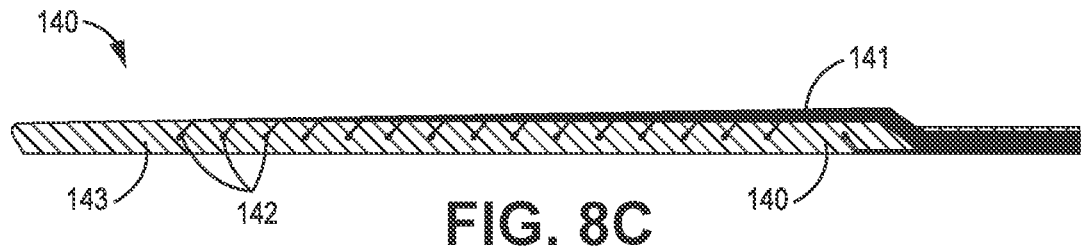
FIG. 8C is a top view of the insulation layer and trace of the probe device of FIG. 8B, according to one embodiment.

In certain implementations, a depth electrode (such as electrode 130) can have a single-layer flexible circuit 140 disposed around or otherwise coupled to the body of the electrode and the electrode contact can be joined to the single-layer circuit 140 via a deposition process, as shown in FIGS. 8A-8J. The deposition process can be any known process, including, for example, sputtering, electron beam deposition, thermal deposition, etc. FIG. 8A depicts the base layer 143 of the flexible circuit 140. As shown in the cross-sectional side view of FIG. 8B, the elongate connector (or "trace") 141 is disposed on the base layer 143. A top view of the probe flexible circuit 140 with multiple separate elongate connectors 141 is shown in FIG. 8C. Each of the traces 141 has a distal end 142 positioned along the length of the flexible circuit 140 such that each is positioned to be in electrical contact with an electrode contact when the contacts are added (as described below).

Figure 8D:
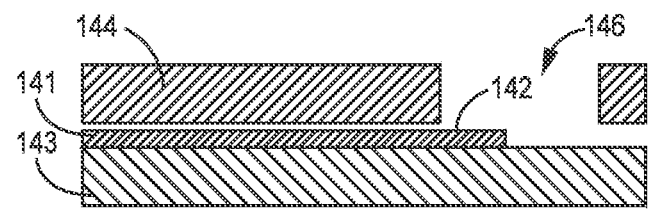
FIG. 8D is a cross-sectional side view of the insulation layer and trace of FIG. 8B, with a temporary mask positioned thereon, according to one embodiment.
Figure 8E:
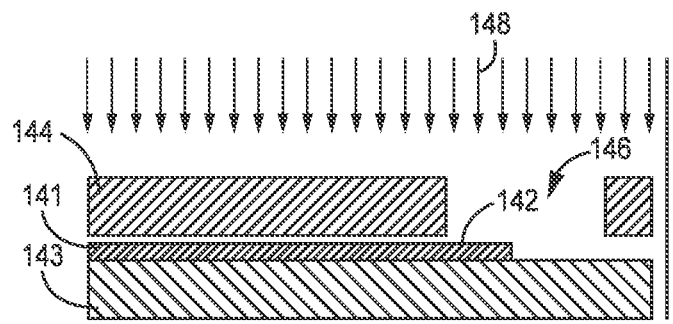
FIG. 8E is a cross-sectional side view of the insulation layer, trace, and mask of FIG. 8D, with electrode contact material being applied thereto, according to one embodiment.

In the first step of the deposition process as best shown in FIGS. 8D and 8E, a temporary mask 144 is disposed over the circuit 140 and connectors 141. The mask 144 has openings 146 defined within the mask 144 that are shaped in the target shape of the contacts to be formed. Each opening 146 is in fluidic communication with a distal end 142 of an elongate connector 141. Once the mask 144 is disposed as desired, the contact material 148 is deposited onto the base layer 143, connector 141, and mask 144 such that the material 148 is positioned within the openings 146, thereby putting the material 148 in each such opening 146 in contact with the distal end 142 of the connector 141 disposed within that opening 146. Other known approaches may be used to pattern the material to be deposited such as, for example, photoresist masking, dry film masking, lift off, wet etch, dry etch, and other such known approaches.

Figure 8F:
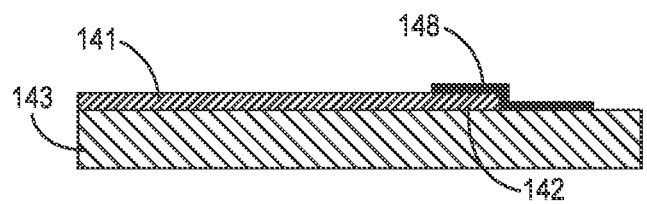
FIG. 8F is a cross-sectional side view of the insulation layer and trace of FIG. 8E, with the electrode contact material applied thereto, according to one embodiment.
Figure 8G:
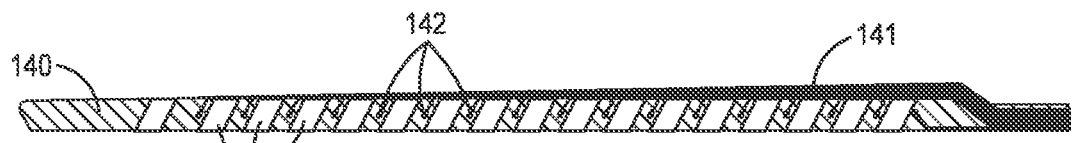
FIG. 8G is a top view of the insulation layer, trace, and electrode contact material of the probe device of FIG. 8F, according to one embodiment.
Figure 8H:
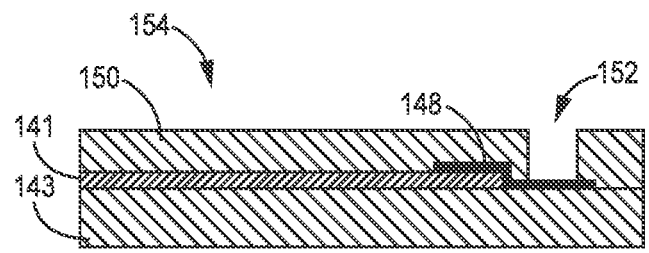
FIG. 8H is a cross-sectional side view of the insulation layer, trace, and electrode material of FIG. 8F, with another insulation layer applied thereto, according to one embodiment.
Figure 8I:
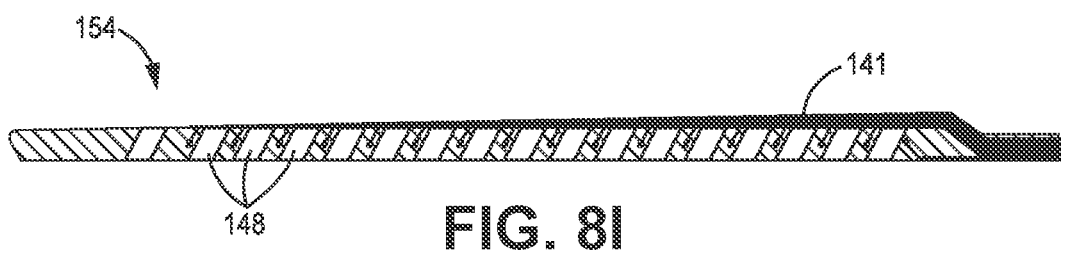
FIG. 8I is a top view of the insulation layer, trace, electrode contact material, and additional insulation layer of the probe device of FIG. 8H, according to one embodiment.

Once the material 148 is deposited within the openings 146 as desired, the mask 144 can be removed, as best shown in FIGS. 8F and 8G, leaving only the contact material 148 formed in bands disposed where the openings 146 were defined such that each contact 148 is in electrical contact with a separate distal end 142 of a trace 141. Once the mask 144 is removed, the next step, as best shown in FIGS. 8H and 8I, involves the addition of the top material 150, thereby resulting in a final product of the flexible circuit 154 with the electrode contacts 152 having the contact material 148. Once the top material 150 is added, the base layer 143 and top layer 150 form the body 143, 150 of the flexible circuit 154. In certain alternative embodiments, an additional step can be a plating step in which the connectors 141 are plated with a plating material (not shown) either before or after the contact material 148 is deposited. That is, in one optional implementation, the connectors 141 are first plated with a plating material (not shown) and then the contact material 148 is deposited, or, alternatively, in the second optional implementation, the contact material 148 is first deposited and then the contact layer 148 is plated with the plating material (not shown).

In one embodiment, it is understood that the contact material 148 to be deposited by physical vapor deposition can include, but is not limited to, any one or more of platinum, titanium, gold, iridium, platinum/iridium, iridium oxide, ruthenium, and ruthenium oxide.

Figure 8J:
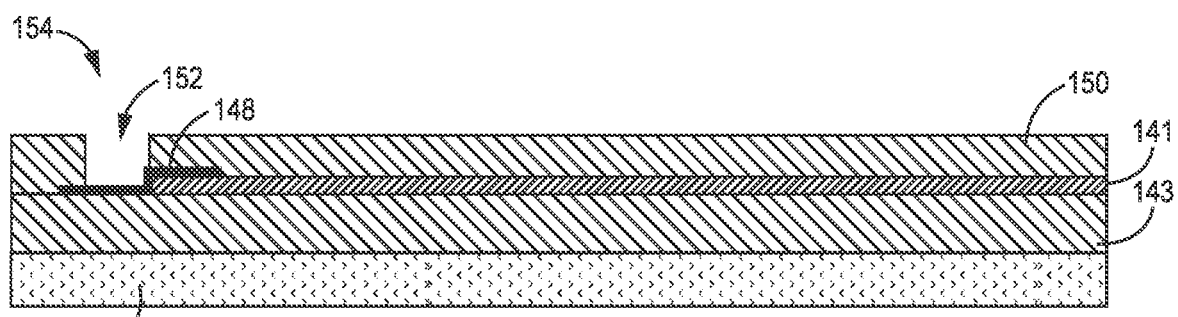
FIG. 8J is a cross-sectional side view of the two insulation layers, trace, and electrode material of FIG. 8H, with an adhesive layer applied thereto, according to one embodiment.

In another optional step, an adhesive layer 156 can be attached to the bottom layer 143 of the circuit 154, as shown in FIG. 8J.

In the final step to create a depth electrode like the electrode 130 in FIG. 7, the flexible circuit 154 is wrapped around a tube such that the probe can have 360 degree coverage by fabricating the device in such a way that each contact is flush with the edge of the device in one or two edges (when the flex circuit is observed in a flat form).

Alternatively, instead of a single-layer flexible circuit (such as the device 140 described above), certain embodiments herein relate to devices having a double-layer flexible circuit with electrode contacts joined to the double-layer circuit via a deposition process. Such devices can then be attached to the body of a depth electrode (such as electrode 130 discussed above). Described below are two different methods of constructing such probes.

Figure 9A:
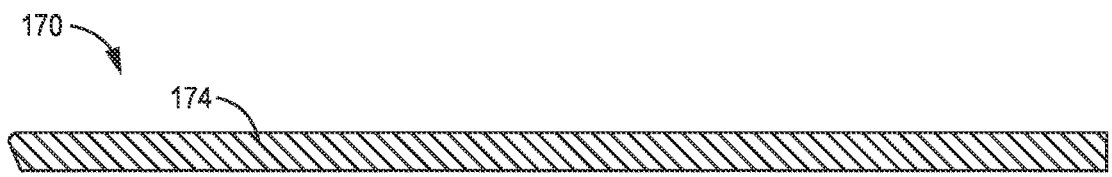
FIG. 9A is a top view of a base layer of a probe device, according to one embodiment.
Figure 9B:
FIG. 9B is a cross-sectional side view of the base layer of FIG. 9A with a trace disposed thereon, according to one embodiment.
Figure 9C:
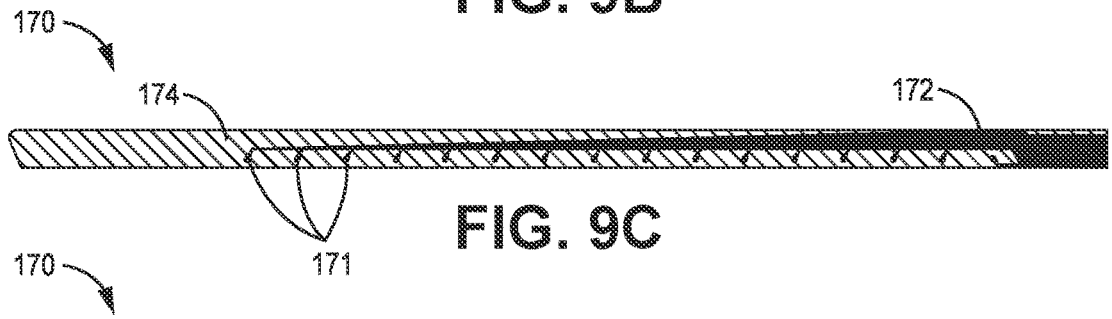
FIG. 9C is a top view of the insulation layer and trace of the probe device of FIG. 9B, according to one embodiment.

A first method of depositing electrode contacts on a double layer circuit device 170, according to one implementation, is shown in FIGS. 9A-9K. The deposition process can be any known process, including, for example, sputtering, electron beam deposition, thermal deposition, etc. FIG. 9A depicts the base layer 174 of the flexible circuit 170. As shown in the cross-sectional side view of FIG. 9B, the elongate connector ("trace") 172 is disposed on the base layer 174. A top view of the probe flexible circuit 170 with the multiple separate elongate connectors 172 disposed on the base layer 174 is shown in FIG. 9C. Each of the traces 172 has a distal end 171 positioned along the length of the flexible circuit 170 such that each is positioned to be in electrical contact with an electrode contact when the contacts are added (as described below).

Figure 9D:
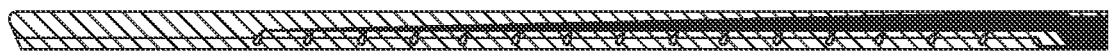
FIG. 9D is a top view of the insulation layer and trace of the probe device and mask disposed thereon of FIG. 9E, according to one embodiment.
Figure 9E:
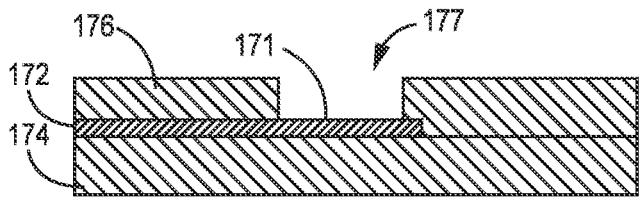
FIG. 9E is a cross-sectional side view of the insulation layer and trace of FIG. 9B, with a temporary mask positioned thereon, according to one embodiment.

According to certain implementations as shown in FIGS. 9D and 9E, a middle insulation material 176 is added to create a middle insulation layer 176. That is, the insulation material 176 is disposed on the trace 172 and the base layer 174 as shown such that an opening 177 is defined in the middle layer 176 wherein the distal end 171 is disposed within the opening.

Figure 9F:
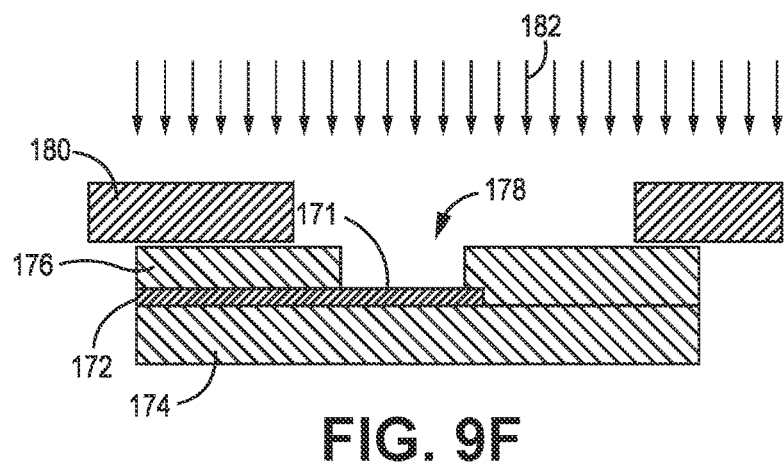
FIG. 9F is a cross-sectional side view of the insulation layer, trace, and mask of FIG. 9E, with electrode contact material being applied thereto, according to one embodiment.

Once the middle insulation layer 176 is added, the contact material is deposited on the device 170. In the first step of the deposition process as best shown in FIG. 9F, a temporary mask 180 is disposed over the connectors 172 and middle insulation layer 176. The mask 180 has openings 178 defined within the mask 180 that are shaped in the target shape of the contacts to be formed. Each opening 178 is in fluidic communication with the opening 177 in the insulation layer 176 and the distal end 171 of an elongate connector 172. Once the mask 180 is disposed as desired, the contact material 182 is deposited onto the intermediate layer 176, traces 172, and mask 180 such that the material 182 is positioned within the openings 177 and openings 178, thereby putting the material 182 in each such opening 177 in contact with the distal end 171 of the connector 172 disposed within that opening 177. Other known approaches may be used to pattern the material to be deposited such as, for example, photoresist masking, dry film masking, lift off, wet etch, dry etch, and other such known approaches.

Figure 9G:
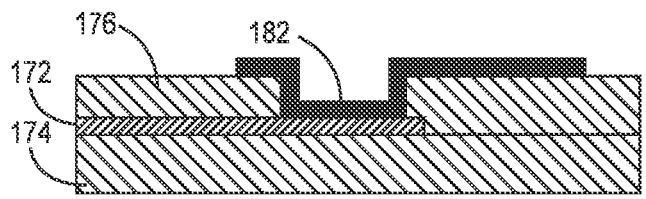
FIG. 9G is a cross-sectional side view of the insulation layer and trace of FIG. 9F, with the electrode contact material applied thereto, according to one embodiment.
Figure 9H:
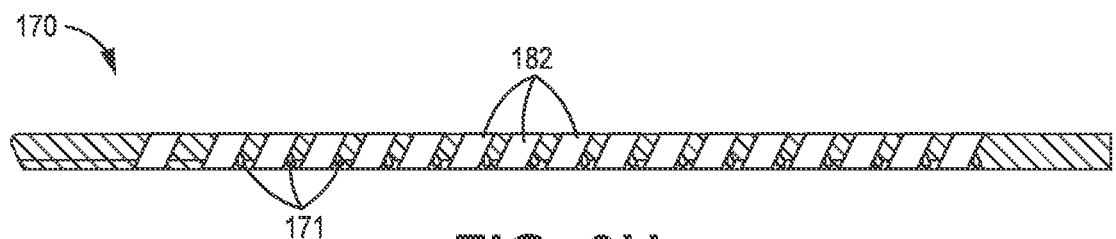
FIG. 9H is a top view of the insulation layer, trace, and electrode contact material of the probe device of FIG. 9G, according to one embodiment.
Figure 9I:
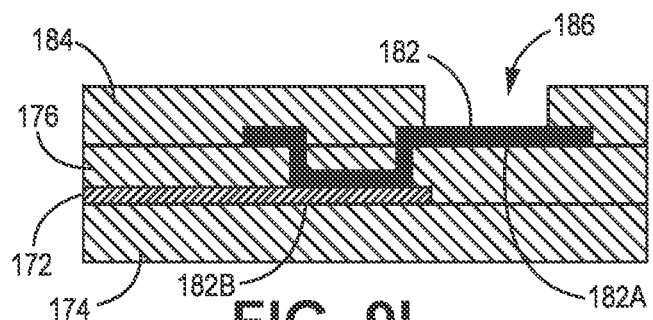
FIG. 9I is a cross-sectional side view of the insulation layer, trace, and electrode material of FIG. 9G, with another insulation layer applied thereto, according to one embodiment.
Figure 9J:
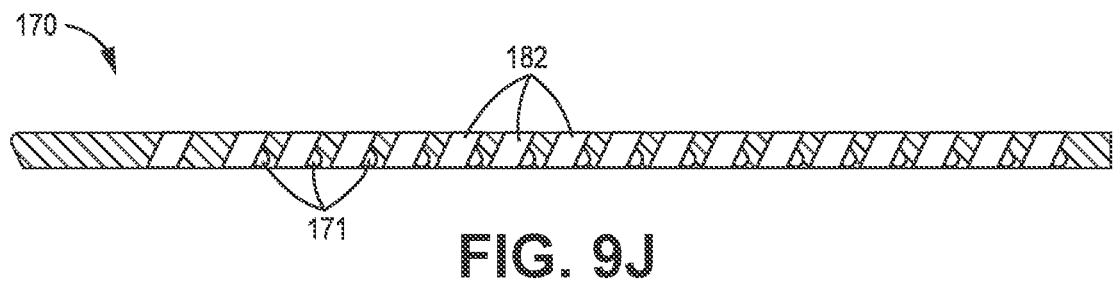
FIG. 9J is a top view of the insulation layer, trace, electrode contact material, and additional insulation layer of the probe device of FIG. 9I, according to one embodiment.

Once the material 182 is deposited within the openings 178 as desired, the mask 180 can be removed, as best shown in FIGS. 9G and 9H, leaving only the contact material 182 disposed where the openings 178 were defined. Once the mask 180 is removed, the next step, as best shown in FIGS. 9I and 9J, involves the addition of the top material 184, thereby resulting in the electrode contacts 186 being made up of the contact material 182. Once the top material 184 is added, the base layer 174, the intermediate layer 176, and top layer 184 form the body 174, 176, 184. In certain alternative embodiments, an additional step can be a plating step in which the connectors 172 are plated with a plating material (not shown) either before or after the middle layer 176 and contact material 182 is deposited. That is, in one optional implementation, the connectors 172 are first plated with a plating material (not shown) and then the middle layer 176 is added and the contact material 182 is deposited, or, alternatively, in the second optional implementation, the middle layer 176 is added and the contact material 182 is deposited and then the contact layer 182 is plated with the plating material (not shown).

In one embodiment, it is understood that the contact material 182 to be deposited by physical vapor deposition can include, but is not limited to, any one or more of platinum, titanium, gold, iridium, platinum/iridium, iridium oxide, ruthenium, and ruthenium oxide.

Figure 9K:
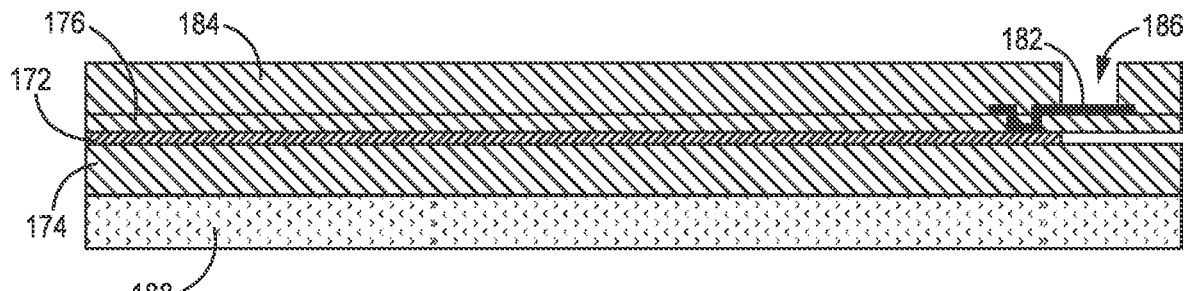
FIG. 9K is a cross-sectional side view of the two insulation layers, trace, and electrode material of FIG. 9I, with an adhesive layer applied thereto, according to one embodiment.

In another optional step, an adhesive layer 188 can be attached to the bottom layer 174, as shown in FIG. 9K.

In the final step to create a depth electrode like the electrode 130 in FIG. 7, the flexible circuit 170 is wrapped around a tube such that the probe can have 360 degree coverage by fabricating the device in such a way that each contact is flush with the edge of the device in one or two edges (when the flex circuit is observed in a flat form).

Figure 10A:
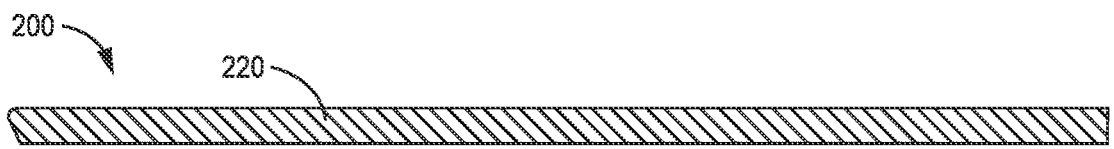
FIG. 10A is a top view of a base layer of a probe device, according to one embodiment.
Figure 10B:
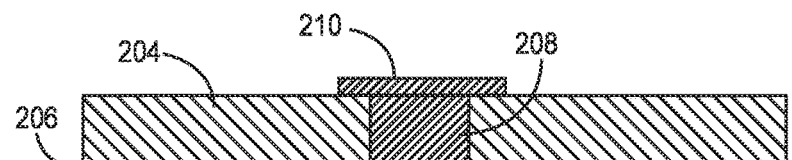
FIG. 10B is a cross-sectional side view of the base layer of FIG. 10A with a trace associated therewith, according to one embodiment.
Figure 10C:
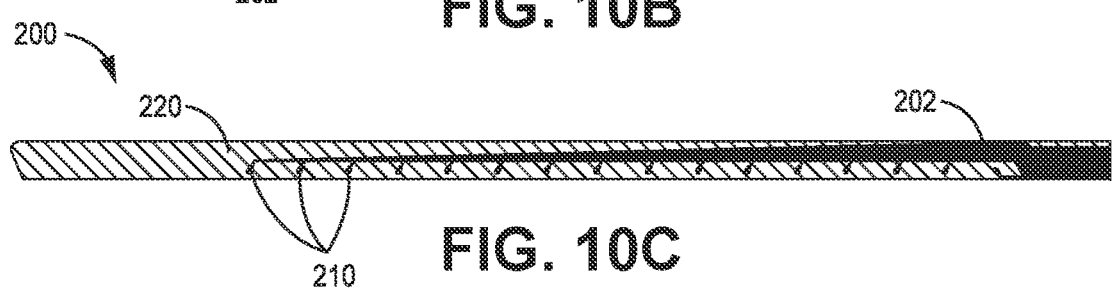
FIG. 10C is a top view of the insulation layer and trace of the probe device of FIG. 10B, according to one embodiment.

A second method of depositing electrode contacts on a double layer circuit device 200, according to an alternative embodiment, is shown in FIGS. 10A-10I. The deposition process can be any known process, including, for example, sputtering, electron beam deposition, thermal deposition, etc. FIG. 10A depicts the base layer 220 of the flexible circuit 200. As shown in the cross-sectional side view of FIG. 9B, the elongate connector ("trace") 202 is disposed on the intermediate layer 204, as will be described in further detail below. More specifically, the trace 202 has an elongate portion 206 disposed on an underside of the intermediate layer 204, a transverse portion 208 extending through the intermediate layer 204 from a distal portion of the elongate portion 206, and a contact portion 210 disposed on the top side (the side opposite the underside) of the intermediate layer 204. A top view of the probe flexible circuit 200 with the multiple separate elongate connectors 202 disposed on the base layer 20XX is shown in FIG. 10C. The contact portions 210 of each of the traces 202 are positioned along the length of the flexible circuit 200 such that each is positioned to be in electrical contact with an electrode contact when the contacts are added (as described below).

Figure 10D:
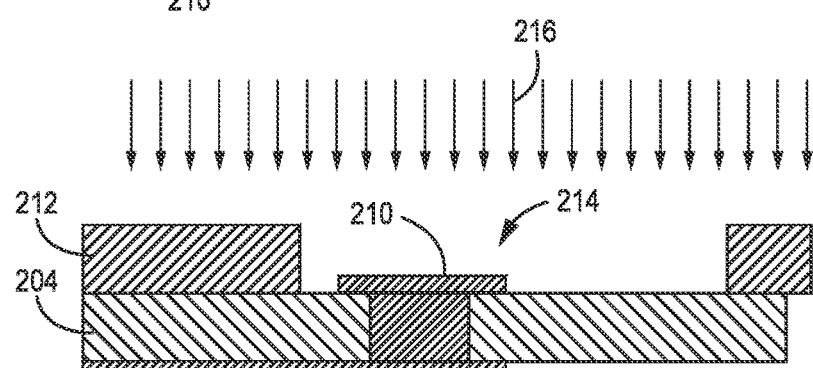
FIG. 10D is a cross-sectional side view of the insulation layer and trace of FIG. 10B, with a temporary mask positioned thereon and the electrode contact material being applied thereto, according to one embodiment.

As depicted in FIG. 10D, the deposition of the contact material on the device 200 is performed as follows in this implementation. In the first step, a temporary mask 212 is disposed over the middle insulation layer 204 with openings 214 defined within the mask 212 that are shaped in the target shape of the contacts to be formed. Each opening 214 is in fluidic communication with the contact portion 210 of an elongate connector 202. Once the mask 212 is disposed as desired, the contact material 216 is deposited onto the intermediate layer 204, contact portions 210 of the traces 202, and mask 212 such that the material 216 is positioned within the openings 214, thereby putting the material 216 in contact with the contact portion 210 of the connector 202 disposed within that opening 214. Other known approaches may be used to pattern the material to be deposited such as, for example, photoresist masking, dry film masking, lift off, wet etch, dry etch, and other such known approaches.

Figure 10E:
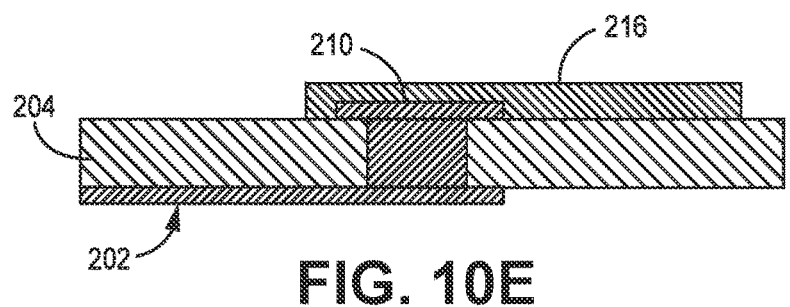
FIG. 10E is a cross-sectional side view of the insulation layer and trace of FIG. 10D, with the electrode contact material applied thereto, according to one embodiment.
Figure 10F:
FIG. 10F is a top view of the insulation layer, trace, and electrode contact material of the probe device of FIG. 10E, according to one embodiment.
Figure 10G:
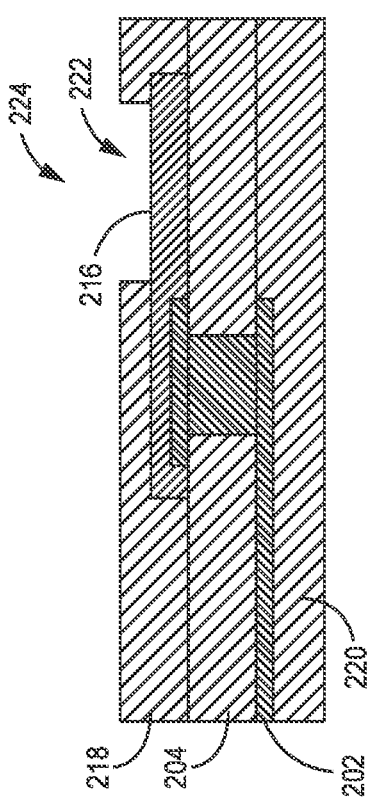
FIG. 10G is a cross-sectional side view of the insulation layer, trace, and electrode material of FIG. 10E, with two additional insulation layers applied thereto, according to one embodiment.
Figure 10H:
FIG. 10H is a top view of the insulation layer, trace, electrode contact material, and additional insulation layers of the probe device of FIG. 10G, according to one embodiment.

Once the material 216 is deposited within the openings 214 as desired, the mask 212 can be removed, as best shown in FIG. 10E, leaving only the contact material 216 disposed where the openings 214 were defined. Once the mask 212 is removed, the next step, as best shown in FIGS. 10G and 10H, involves the addition of the top material 218 and the base material 220, resulting in the top layer 218 and base layer 220. The top material 218 has openings 222 defined therein that are disposed over the contact material 216, thereby resulting in electrode contacts 224 that are made up of the contact material 216. Once the top material 218 and base material 220 are added, the base layer 220, the intermediate layer 204, and top layer 218 form the body 220, 204, 218.

In certain alternative embodiments, an additional step can be a plating step in which the connectors 202 are plated with a plating material (not shown) either before or after the contact material 216 is deposited. That is, in one optional implementation, the connectors 202 are first plated with a plating material (not shown) and then the contact material 216 is deposited, or, alternatively, in the second optional implementation, the contact material 216 is deposited and then the connector 202 is plated with the plating material (not shown).

In one embodiment, it is understood that the contact material 216 to be deposited by physical vapor deposition can include, but is not limited to, any one or more of platinum, titanium, gold, iridium, platinum/iridium, iridium oxide, ruthenium, and ruthenium oxide.

Figure 10I:
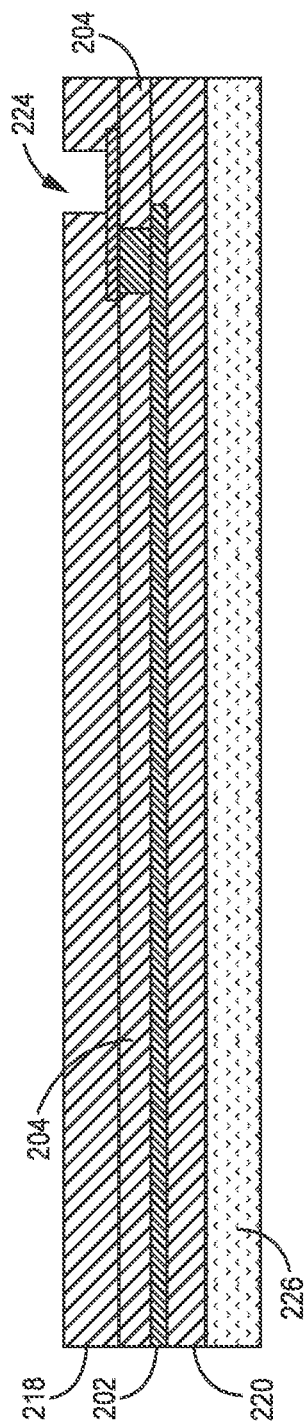
FIG. 10I is a cross-sectional side view of the three insulation layers, trace, and electrode material of FIG. 10G, with an adhesive layer applied thereto, according to one embodiment.

In another optional step, an adhesive layer 226 can be attached to the bottom layer 220, as shown in FIG. 10I.

In the final step to create a depth electrode like the electrode 130 in FIG. 7, the flexible circuit 200 is wrapped around a tube such that the probe can have 360 degree coverage by fabricating the device in such a way that each contact is flush with the edge of the device in one or two edges (when the flex circuit is observed in a flat form).

Figure 11A:
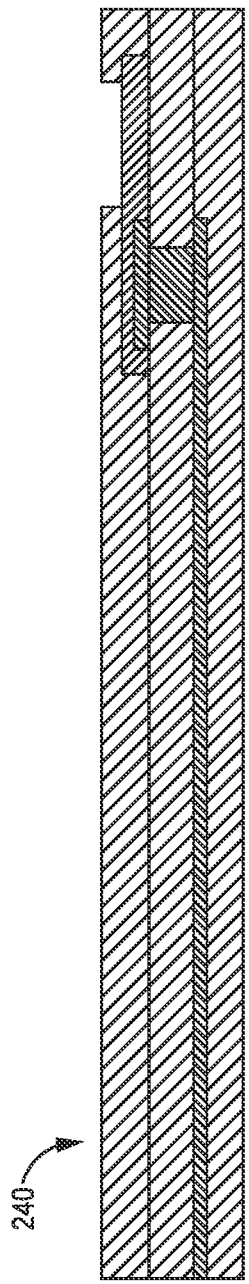
FIG. 11A is a cross-sectional side view of a complete probe device with three insulation layers, trace, and electrode material, according to one embodiment.
Figure 11B:
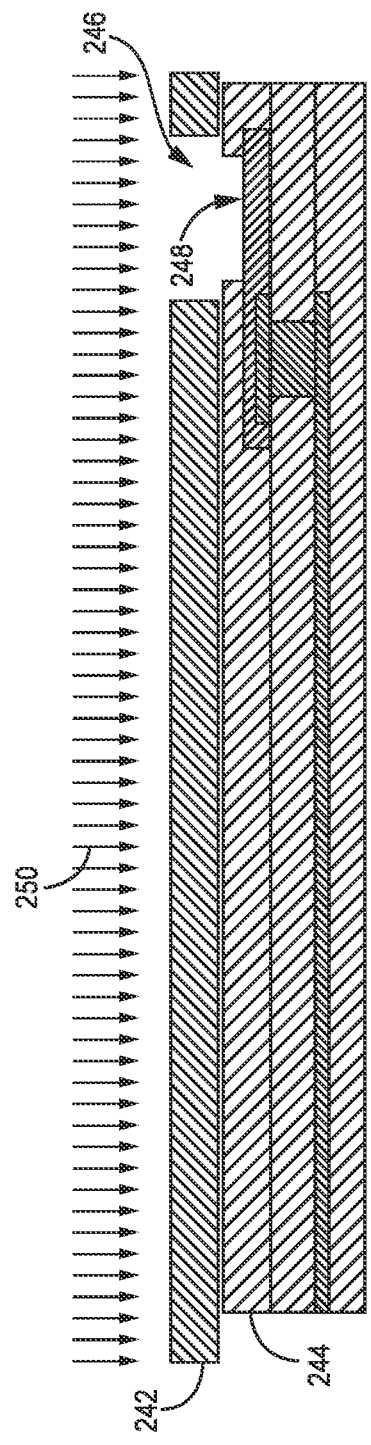
FIG. 11B is a cross-sectional side view of the device of FIG. 11A, with a temporary mask positioned thereon and the additional electrode contact material being applied thereto, according to one embodiment.
Figure 11C:
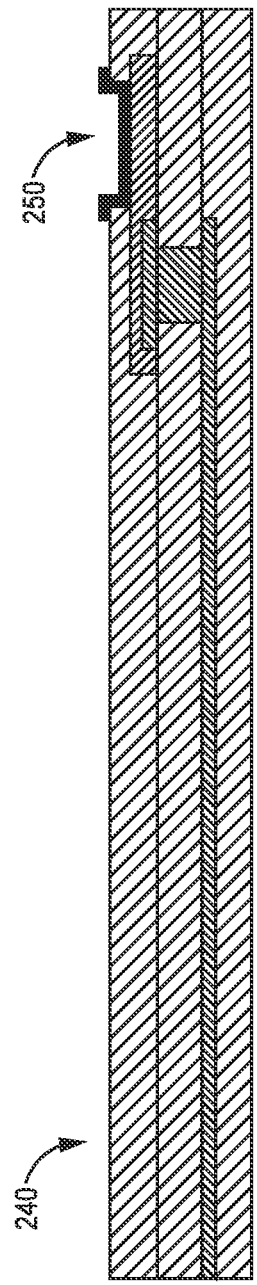
FIG. 11C is a cross-sectional side view of the device of FIG. 11B, with the additional electrode contact material applied thereto, according to one embodiment.

For any of the embodiments described or contemplated herein, an additional step can be performed to add additional material to the electrode contact of the device, as shown in FIGS. 11A-11C, according to one implementation. The additional electrode contact material can further improve the performance of the device or provide new functionality, such as stronger electrical stimulation, improved biocompatibility, etc.

Once the probe 240 according to any embodiment herein is finished as shown in FIG. 11A, a temporary mask 242 is disposed over the top insulation layer 244 of the device 240 as shown in FIG. 11B. Alternatively, the mask 242 can be disposed over the top layer 244 at any point during the above processes after the top layer 244 has been added. The mask 242 has openings 246 defined within the mask 242 that are shaped in the target shape of the contacts to be formed. Each opening 246 is in fluidic communication with the electrode contact 248 previously attached to the device 240. Once the mask 242 is disposed as desired, the additional contact material 250 is deposited onto the probe 240 and mask 242 such that the additional material 250 is positioned within the openings 246, thereby putting the additional material 250 in each such opening 246 in contact with the original electrode contact 248. Other known approaches may be used to pattern the material to be deposited such as, for example, photoresist masking, dry film masking, lift off, wet etch, dry etch, and other such known approaches.

Once the material 250 is deposited within the openings 246 as desired, the mask 242 can be removed, as best shown in FIG. 11C, leaving only the additional contact material 250 disposed where the openings 246 were defined.

In certain embodiments, the above placement of the additional material can be performed using the support plate 110 and the deposition chamber process described in detail above. That is, the device 240 as shown in FIG. 11A can be placed on the support plate 110 and placed in the deposition chamber according to the various steps, and alternative steps, discussed above. Alternatively, any known deposition method can be used. The additional material can be any one or more of titanium, platinum, iridium, iridium oxide, gold, ruthenium, ruthenium oxide, or platinum/iridium.

Of course, the steps above to add additional contact material can be performed on any of the various devices disclosed or contemplated herein. The specific device depicted in FIGS. 11A-11C is merely the exemplary device used for purposes of describing the process.

Although the various embodiments have been described with reference to preferred implementations, persons skilled in the art will recognize that changes may be made in form and detail without departing from the spirit and scope thereof.

What is claimed is:

1. A method of making a neural probe, the method comprising:
    positioning a first side of a thin film elongate connector on a first side of a first insulation layer, the thin film elongate connector having a second side disposed opposite the first side, the elongate connector extending along the first side of the first insulation layer from a proximal portion of the elongate connector and terminating in a distal end, the distal end positioned along a length of the first insulation layer leaving an exposed portion of the first side of the insulation layer adjacent to the distal end of the elongate connector;
    depositing an electrode contact material onto a contact area that includes a portion of the second side of the elongate connector and a portion of the exposed portion of the first side of the first insulation layer, the electrode contact material being deposited onto the contact area via physical vapor deposition such that a thin film electrode contact is formed; and
    positioning a first side of a second insulation layer onto the first side of the first insulation layer, wherein the second insulation layer comprises an opening defined in fluidic communication with the electrode contact material deposited onto the contact area.

2. The method of claim 1, further comprising positioning a third insulation layer in contact with a second side of the first insulation layer.

3. The method of claim 1, further comprising positioning an adhesive layer in contact with a second side of the first insulation layer.

4. The method of claim 1, further comprising positioning a third insulation layer in contact with a second side of the second insulation layer.

5. The method of claim 1, further comprising treating the first side of the first insulation layer and the elongate connector before depositing the electrode contact material.

6. The method of claim 1, further comprising:
disposing a mask over the elongate connector and the first insulation layer before depositing the electrode contact material onto the contact area, wherein the mask comprises at least one mask opening defined within the mask, wherein the at least one mask opening is in fluidic communication with the distal end of the elongate connector and the portion of the exposed portion of the first side of the first insulation layer.

7. The method of claim 1, wherein a portion of the thin film electrode contact is disposed between the first and second insulation layers.

8. The method of claim 1, further comprising positioning an elongate portion of the elongate connector on the second side of the first insulation layer, wherein the elongate connector positioned on the first side of the first insulation layer comprises a contact portion, and wherein the contact portion is electrically coupled to the elongate portion via a transverse portion.

9. A method of making a neural probe, the method comprising:
positioning a thin film elongate connector along a length of a first side of a base insulation layer, the thin film elongate connector comprising at least one single-layered trace extending from a main portion of the thin film elongate connector to a distal end portion of the at least one single-layered trace, the at least one single-layered trace having a first side disposed on the first side of the base insulation layer and a second side disposed opposite the first side;
depositing an electrode contact material onto an area comprising a portion of the second side of the distal end portion of the at least one single-layered trace and an adjoining portion of the first side of the base insulation layer via physical vapor deposition; and
positioning a first side of a top insulation layer onto the first side of the base insulation layer, wherein the top insulation layer comprises a contact opening defined in the top insulation layer, wherein the contact opening is in fluidic communication with the electrode contact material such that the electrode contact material is disposed within the contact opening at some depth from a second side of the top insulation layer.

10. The method of claim 9, further comprising positioning the base insulation layer on a support plate and positioning the base insulation layer and the support plate in a deposition chamber before depositing the electrode contact material.

11. The method of claim 10, further comprising, before positioning the support plate in the chamber, attaching a mask to the support plate such that the base insulation layer and the elongate connector are disposed between the support plate and the mask, wherein the mask comprises a mask opening defined within the mask, and wherein the top insulation layer is positioned such that the contact opening is in fluid communication with the deposited electrode contact material.

12. The method of claim 9, further comprising, before depositing the electrode contact material, treating the first side of the base insulation layer and the elongate connector.

13. The method of claim 12, wherein the treating the first side of the base insulation layer and the elongate connector comprises etching the first side of the base insulation layer and the elongate connector with an etching plasma gas.

14. A method of making a neural probe, the method comprising:
positioning a contact portion of a thin film elongate connector on a first side of a middle insulation layer, wherein a first side of the contact portion of the elongate connector is disposed on the first side of the middle insulation layer, wherein the contact portion has a second side disposed opposite the first side, wherein an elongate portion of the elongate connector is disposed on a second side of the middle insulation layer, and wherein the contact portion is electrically coupled to the elongate portion via a transverse portion;
depositing an electrode contact material onto a portion of the second side of the contact portion of the elongate connector and onto an adjoining portion of the first side of the middle insulation layer via physical vapor deposition;
positioning a first side of a top insulation layer onto the first side of the middle insulation layer, wherein the top insulation layer comprises a contact opening defined in the top insulation layer, wherein the contact opening is in fluidic communication with the electrode contact material; and
positioning a first side of a bottom insulation layer onto the second side of the middle insulation layer,
wherein the top insulation layer, the middle insulation layer, and the bottom insulation layer form a body of the neural probe.

15. The method of claim 14, further comprising, before depositing the electrode contact material:
positioning the middle insulation layer and elongate connector on a support plate;
attaching a mask to the support plate such that the middle insulation layer and elongate connector is disposed between the support plate and the mask, wherein the mask comprises a mask opening defined within the mask, wherein the mask opening is in fluidic communication with the contact portion of the elongate connector; and
positioning the support plate in a deposition chamber.

16. A method of making a neural probe, the method comprising:
positioning a first side of a thin film elongate connector on a first side of a first insulation layer, the thin film elongate connector having a second side disposed opposite the first side, the elongate connector extending along the first side of the first insulation layer from a proximal portion to a distal portion of the elongate connector, the first side of the first insulation layer having an exposed surface adjoining the distal portion of the elongate connector;
positioning the first insulation layer and the elongate connector on a support plate;
positioning a mask over the first insulation layer and the elongate connector, the mask comprising a mask opening defined within the mask, the mask opening positioned to leave exposed an area including a portion of the second side of the distal portion of the elongate connector and the exposed surface of the first insulation layer adjoining the distal portion of the elongate connector;
positioning the support plate in a deposition chamber;
depositing an electrode contact material through the mask opening and onto the portion of the second side of the distal portion of the elongate connector and onto the adjoining exposed surface of the first side of the first insulation layer via physical vapor deposition within the deposition chamber such that a thin film electrode contact is formed; and positioning a first side of a second insulation layer onto the first side of the first insulation layer such that a portion of the thin film electrode contact is disposed between the first insulation layer and the second insulation layer, wherein the second insulation layer comprises an opening defined in fluidic communication with the electrode contact material.

17. The method of claim 16, further comprising, before depositing the electrode contact material, attaching the mask to the support plate such that the first insulation layer and the elongate connector is disposed between the support plate and the mask, wherein the mask opening is in fluidic communication with the distal portion of the elongate connector.

18. The method of claim 1, wherein the thin film elongate connector comprises a first metal, and wherein the electrode contact material comprises a second metal.

19. The method of claim 2, wherein the first insulation layer, the second insulation layer, and the third insulation layer form a body of the neural probe.

* * * * *